United States Patent
Liu et al.

(10) Patent No.: US 10,454,663 B2
(45) Date of Patent: Oct. 22, 2019

(54) WIRELESS COMMUNICATIONS METHOD AND SYSTEM, AND FULL-DUPLEX WIRELESS TRANSCEIVER

(71) Applicant: HUAWEI TECHNOLOGIES CO., LTD., Shenzhen, Guangdong (CN)

(72) Inventors: Jinnan Liu, Beijing (CN); Shulan Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 15/388,381

(22) Filed: Dec. 22, 2016

(65) Prior Publication Data
US 2017/0104576 A1    Apr. 13, 2017

Related U.S. Application Data

(63) Continuation of application No. PCT/CN2014/080777, filed on Jun. 26, 2014.

(51) Int. Cl.
*H04L 5/14* (2006.01)
*H04B 1/525* (2015.01)
(Continued)

(52) U.S. Cl.
CPC .......... *H04L 5/1461* (2013.01); *H04B 1/525* (2013.01); *H04B 1/711* (2013.01); *H04B 17/318* (2015.01);
(Continued)

(58) Field of Classification Search
CPC ............... H04L 5/1461; H04L 25/0202; H04L 25/0453; H04B 17/318; H04B 17/345; H04B 1/525; H04B 1/711
See application file for complete search history.

(56) References Cited

U.S. PATENT DOCUMENTS 7,826,801 B2    11/2010  Baik et al.
2002/0126739 A1*  9/2002  Tiedemann, Jr. ....... C08L 23/04
                                                                   375/141
(Continued)

FOREIGN PATENT DOCUMENTS

| CN | 101438509 | 5/2009 |
|----|-----------|--------|
| CN | 103338172 | 10/2013 |

(Continued)

OTHER PUBLICATIONS

International Searching Authority, Written Opinion of the International Searching Authority, dated Mar. 2015, PCT/CN2014/080777.*
(Continued)

*Primary Examiner* — Jenee Holland
(74) *Attorney, Agent, or Firm* — Fish & Richardson P.C.

(57) ABSTRACT

Embodiments of the present invention disclose a wireless communications method and system, and a full-duplex wireless transceiver, where the method includes: modulating a transmit digital signal into a first radio frequency signal and outputting the first radio frequency signal to a transmit antenna; then performing, under control of a pre-generated control signal, phase adjustment and amplitude adjustment on the first radio frequency signal and obtaining a cancellation signal; performing self-interference cancellation on a second radio frequency signal received from a radio air interface by using a receive antenna and the cancellation signal so as to generate a third radio frequency signal obtained after self-interference cancellation; and finally demodulating the third radio frequency signal into a receive digital signal.

17 Claims, 9 Drawing Sheets

(51) Int. Cl.
  *H04W 72/04* (2009.01)
  *H04L 25/02* (2006.01)
  *H04B 17/345* (2015.01)
  *H04B 17/318* (2015.01)
  *H04B 1/711* (2011.01)

(52) U.S. Cl.
  CPC ....... *H04B 17/345* (2015.01); *H04L 25/0202* (2013.01); *H04W 72/0453* (2013.01)

(56) References Cited

U.S. PATENT DOCUMENTS

| | | | | |
|---|---|---|---|---|
| 2002/0153952 A1* | 10/2002 | Louis | ............... | H03F 1/3229 330/151 |
| 2002/0155821 A1* | 10/2002 | Louis | ............... | H03F 1/3229 455/115.1 |
| 2003/0031279 A1* | 2/2003 | Blount | ............... | H04B 1/525 375/346 |
| 2004/0053592 A1* | 3/2004 | Reial | ............... | H04B 1/7113 455/303 |
| 2009/0180404 A1* | 7/2009 | Jung | ............... | H04B 7/15585 370/279 |
| 2012/0106405 A1* | 5/2012 | Lioliou | ............... | H04B 7/15528 370/279 |
| 2012/0201153 A1 | 8/2012 | Bharadia et al. | | |
| 2015/0049834 A1* | 2/2015 | Choi | ............... | H04B 1/525 375/285 |
| 2015/0063176 A1* | 3/2015 | Hong | ............... | H04B 7/15585 370/279 |
| 2015/0156003 A1* | 6/2015 | Khandani | ............... | H04L 5/143 370/278 |
| 2015/0156004 A1* | 6/2015 | Khandani | ............... | H04L 5/1423 370/278 |
| 2015/0180640 A1* | 6/2015 | Liu | ............... | H04B 1/525 370/278 |
| 2015/0236750 A1* | 8/2015 | Choi | ............... | H04B 1/525 370/278 |
| 2016/0211927 A1* | 7/2016 | Mo | ............... | H04B 1/123 |
| 2018/0070394 A1* | 3/2018 | Khandani | ............... | H04W 76/10 |

FOREIGN PATENT DOCUMENTS

| | | |
|---|---|---|
| CN | 103427872 | 12/2013 |
| CN | 103427874 | 12/2013 |
| WO | WO2010141556 | 12/2010 |

OTHER PUBLICATIONS

International Search Report dated Mar. 27, 2015 in corresponding International Application No. PCT/CN2014/080777.
International Search Report, dated Mar. 27, 2015, in International Application No. PCT/CN2014/080777 (4 pp.).
Search Report, dated Dec. 7, 2016, in Chinese Application No. 2014800350249 (2 pp.).
Office Action, dated Dec. 16, 2016, in Chinese Application No. 201480035024.9 (7 pp.).
Jain, M. et al., *Practical, Real-time, Full Duplex Wireless*, MobiCom'11, Sep. 19-23, 2011, Las Vegas, Nevada, USA (12 pp.).
Bharadia, D. et al., Full Duplex Radios, SIGCOMM'13, Aug. 12-16, 2013, Hong Kong, China (12 pp.).
Extended European Search Report dated Jun. 21, 2017 in corresponding European Patent Application No. 14895650.1.

* cited by examiner

WIRELESS COMMUNICATIONS METHOD AND SYSTEM, AND FULL-DUPLEX WIRELESS TRANSCEIVER

CROSS-REFERENCE TO RELATED APPLICATIONS

This application is a continuation of International Application No. PCT/CN2014/080777, filed on Jun. 26, 2014, the disclosure of which is hereby incorporated by reference in its entirety.

TECHNICAL FIELD

The present invention relates to the field of communications technologies, and in particular, to a wireless communications method and system, and a full-duplex wireless transceiver.

BACKGROUND

Currently, mobile communications technologies used in a cellular communications system include frequency division duplex (FDD) and time division duplex (TDD). For the FDD, signals are received and sent on two independent and paired channels, and one guard frequency band that is used to separate an uplink channel from a downlink channel exists between the two channels. For the TDD, although an uplink channel and a downlink channel use a same frequency, the uplink channel and the downlink channel serve as transmission channels in different timeslots. No matter whether the cellular communications system uses the FDD or the TDD, a terminal or a base station is only in either a receiving or sending state at a same frequency or in a same time period. Full-duplex means that a receive end and a transmit end of communication can concurrently perform receiving and sending at a same frequency and in a same time period, which may double a channel capacity in theory. Although a full-duplex technology can increase a channel capacity, a transmitted radio frequency signal is many times stronger than a received radio frequency signal, and as a result, the transmitted radio frequency signal causes interference to the received radio frequency signal.

Currently, a full-duplex wireless transceiver may generally perform self-interference cancellation on an interfering signal in an analog domain or a digital domain by using an antenna, where the performing self-interference cancellation on the interfering signal in the analog domain is particularly important. In the prior art, the full-duplex wireless transceiver performs self-interference cancellation on a radio frequency signal by using an analog device (such as a delayer, an attenuator, and a phase shifter), but adjustable digits of the analog device are limited, which causes a problem that an effect of self-interference cancellation performed by the full-duplex wireless transceiver on the radio frequency signal is not ideal.

SUMMARY

Embodiments of the present invention disclose a wireless communications method and system, and a full-duplex wireless transceiver, which are used to resolve a problem that, in an existing full-duplex mobile communications technology, a self-interference cancellation effect is not ideal because the full-duplex wireless transceiver performs self-interference cancellation on a radio frequency signal by using an analog device.

A first aspect of embodiments of the present invention discloses a full-duplex wireless transceiver, including a sending module, a receiving module, a cancellation signal generation module, and a channel estimation module, where the cancellation signal generation module includes several adjustment submodules, an output end of the sending module is connected to an input end of the cancellation signal generation module and a transmit antenna, an output end of the cancellation signal generation module is connected to a first input end of the receiving module, a second input end of the receiving module is connected to a receive antenna, a control end of the cancellation signal generation module is connected to an output end of the channel estimation module, a first input end of the channel estimation module is connected to an output end of the receiving module, and a second input end of the channel estimation module is connected to an input end of the sending module, where:

the channel estimation module is configured to compute a channel characteristic of a wireless self-interference channel between the transmit antenna and the receive antenna, generate a control signal according to the channel characteristic, and output the control signal to the adjustment submodule;

the sending module is configured to modulate an input transmit digital signal into a first radio frequency signal, and output the first radio frequency signal to the adjustment submodule and the transmit antenna;

the adjustment submodule is configured to receive the first radio frequency signal and the control signal and perform, under control of the control signal, phase adjustment and amplitude adjustment on the first radio frequency signal, and obtain a cancellation signal;

the adjustment submodule is further configured to output the cancellation signal to the receiving module;

the receiving module is configured to receive the cancellation signal and receive a second radio frequency signal from a radio air interface, and perform self-interference cancellation on the second radio frequency signal and the cancellation signal so as to generate a third radio frequency signal obtained after self-interference cancellation; and the receiving module is further configured to demodulate the third radio frequency signal into a receive digital signal.

In a first possible implementation manner of the first aspect of the embodiments of the present invention, at least one of the adjustment submodules in the several adjustment submodules is further configured to perform delay adjustment on the first radio frequency signal.

With reference to the first aspect of the embodiments of the present invention, in a second possible implementation manner of the first aspect of the embodiments of the present invention, the adjustment submodule that is configured to perform phase adjustment and amplitude adjustment on the first radio frequency signal includes a first vector modulator; and/or the adjustment submodule that is configured to perform phase adjustment and amplitude adjustment on the first radio frequency signal includes a first numerical control delay line and a first numerical control attenuator.

With reference to the first possible implementation manner of the first aspect of the embodiments of the present invention, in a third possible implementation manner of the first aspect of the embodiments of the present invention, the adjustment submodule that is configured to perform phase adjustment, amplitude adjustment, and delay adjustment on the first radio frequency signal includes a second vector modulator and a second numerical control delay line; and/or the adjustment submodule that is configured to perform phase adjustment, amplitude adjustment, and delay adjustment on the first radio frequency signal includes a third numerical control delay line, a second numerical control attenuator, and a fourth numerical control delay line.

With reference to the third possible implementation manner of the first aspect of the embodiments of the present invention, in a fourth possible implementation manner of the first aspect of the embodiments of the present invention, the cancellation signal generation modules between one transmit antenna and multiple receive antennas share the second numerical control delay line.

With reference to the third possible implementation manner of the first aspect of the embodiments of the present invention, in a fifth possible implementation manner of the first aspect of the embodiments of the present invention, the cancellation signal generation modules between one transmit antenna and multiple receive antennas share the fourth numerical control delay line.

With reference to the second possible implementation manner of the first aspect of the embodiments of the present invention, in a sixth possible implementation manner of the first aspect of the embodiments of the present invention, an input end of the first vector modulator is connected to an output end of the sending module, an output end of the first vector modulator is connected to a first input end of the receiving module, and a control end of the first vector modulator is connected to an output end of the channel estimation module, where:

the first vector modulator is configured to adjust a phase and an amplitude of the first radio frequency signal according to the control signal so as to obtain the cancellation signal, and output the cancellation signal to the first input end of the receiving module.

With reference to the second possible implementation manner of the first aspect of the embodiments of the present invention, in a seventh possible implementation manner of the first aspect of the embodiments of the present invention, an input end of the first numerical control delay line is connected to the output end of the sending module, an output end of the first numerical control delay line is connected to an input end of the first numerical control attenuator, a control end of the first numerical control delay line and a control end of the first numerical control attenuator are separately connected to the output end of the channel estimation module, and an output end of the first numerical control attenuator is connected to the first input end of the receiving module, where:

the first numerical control delay line is configured to adjust a phase of the first radio frequency signal according to the control signal so as to obtain the phase-adjusted first radio frequency signal, and output the first radio frequency signal to the first numerical control attenuator; and the first numerical control attenuator is configured to adjust an amplitude of the first radio frequency signal according to the control signal so as to generate the cancellation signal, and output the cancellation signal to the first input end of the receiving module.

With reference to the third possible implementation manner of the first aspect of the embodiments of the present invention, in an eighth possible implementation manner of the first aspect of the embodiments of the present invention, an input end of the second numerical control delay line is connected to the output end of the sending module, an output end of the second numerical control delay line is connected to an input end of the second vector modulator, a control end of the second numerical control delay line and a control end of the second vector modulator are separately connected to the output end of the channel estimation module, and an output end of the second vector modulator is connected to the first input end of the receiving module, where:

the second numerical control delay line is configured to adjust a delay of the first radio frequency signal according to the control signal so as to obtain the delay-adjusted first radio frequency signal, and output the first radio frequency signal to the second vector modulator; and the second vector modulator is configured to adjust a phase and an amplitude of the first radio frequency signal according to the control signal so as to obtain the cancellation signal, and output the cancellation signal to the first input end of the receiving module.

With reference to the third possible implementation manner of the first aspect of the embodiments of the present invention, in a ninth possible implementation manner of the first aspect of the embodiments of the present invention, an input end of the third numerical control delay line is connected to the output end of the sending module, an output end of the third numerical control delay line is connected to an input end of the second numerical control attenuator, a control end of the third numerical control delay line, a control end of the second numerical control attenuator, and a control end of the fourth numerical control delay line are separately connected to the output end of the channel estimation module, an output end of the second numerical control attenuator is connected to an input end of the fourth numerical control delay line, and an output end of the fourth numerical control delay line is connected to the first input end of the receiving module, where:

the third numerical control delay line is configured to adjust a phase of the first radio frequency signal according to the control signal so as to obtain the phase-adjusted first radio frequency signal, and output the first radio frequency signal to the second numerical control attenuator;

the second numerical control attenuator is configured to adjust an amplitude of the first radio frequency signal according to the control signal so as to obtain the amplitude-adjusted first radio frequency signal, and output the first radio frequency signal to the fourth numerical control delay line; and the fourth numerical control delay line is configured to adjust a delay of the first radio frequency signal according to the control signal so as to generate the cancellation signal, and output the cancellation signal to the first input end of the receiving module.

With reference to any one of the first aspect of the embodiments of the present invention, or the first possible implementation manner to the ninth possible implementation manner of the first aspect of the embodiments of the present invention, in a tenth possible implementation manner of the first aspect of the embodiments of the present invention, the cancellation signal generation module further includes a switch control submodule and switch submodules that are in a one-to-one correspondence with the several adjustment submodules, where:

the switch submodule is configured to control a work status of the adjustment submodule between a pair of the first radio frequency signal and the second radio frequency signal, where the adjustment submodule is corresponding to the switch submodule, and the work status includes a connected state or a non-connected state; and the switch control submodule is configured to determine a quantity of adjustment submodules in the connected state in the several adjustment submodules by using a predefined criterion.

With reference to the tenth possible implementation manner of the first aspect of the embodiments of the present invention, in an eleventh possible implementation manner of the first aspect of the embodiments of the present invention, a manner in which the switch control submodule determines a quantity of adjustment submodules in the connected state in the several adjustment submodules by using a predefined criterion is specifically:

obtaining energy corresponding to each path in N paths of the wireless self-interference channel from the channel estimation module;

determining M paths from the N paths, so that a ratio of a first sum of energy corresponding to each path in the M paths to a second sum of energy corresponding to each path in remaining (N-M) paths of the N paths apart from the M paths is greater than a preset first threshold, where the energy corresponding to any path in the M paths is greater than the energy corresponding to any path in the (N-M) paths, and M is a positive integer and M is the quantity of adjustment submodules in the connected state in the several adjustment submodules determined by the switch control submodule, and N is greater than M; and/or obtaining a first received signal strength indicator of the second radio frequency signal and a second received signal strength indicator of the third radio frequency signal;

when the second received signal strength indicator of the third radio frequency signal is greater than a preset second threshold, or when a difference between the first received signal strength indicator of the second radio frequency signal and the second received signal strength indicator of the third radio frequency signal is less than a preset third threshold, increasing the quantity of adjustment submodules in the connected state; or when a difference between the first received signal strength indicator of the second radio frequency signal and the second received signal strength indicator of the third radio frequency signal is greater than a preset fourth threshold, decreasing the quantity of adjustment submodules in the connected state.

A second aspect of embodiments of the present invention discloses a full-duplex wireless transceiver, including a memory and a processor, where the memory stores a group of program code, and the processor is configured to invoke the program code stored in the memory, and configured to perform the following operations:

modulating a transmit digital signal into a first radio frequency signal, and outputting the first radio frequency signal to a transmit antenna;

performing, under control of a pre-generated control signal, phase adjustment and amplitude adjustment on the first radio frequency signal, and obtaining a cancellation signal; and performing self-interference cancellation on a second radio frequency signal received from a radio air interface by using a receive antenna and the cancellation signal so as to generate a third radio frequency signal obtained after self-interference cancellation, and demodulating the third radio frequency signal into a receive digital signal.

In a first possible implementation manner of the second aspect of the embodiments of the present invention, before the processor performs, under control of a pre-generated control signal, phase adjustment and amplitude adjustment on the first radio frequency signal, the processor is configured to invoke the program code stored in the memory, and further configured to perform the following operations:

computing a channel characteristic of a wireless self-interference channel between the transmit antenna and the receive antenna; and generating the control signal according to the channel characteristic.

With reference to the second aspect of the embodiments of the present invention or the first possible implementation manner of the second aspect of the embodiments of the present invention, in a second possible implementation manner of the second aspect of the embodiments of the present invention, before the processor obtains a cancellation signal, the processor is configured to invoke the program code stored in the memory, and further configured to perform the following operation:

adjusting a delay of the first radio frequency signal according to the control signal.

A third aspect of embodiments of the present invention discloses a wireless communications system, including a terminal and a base station, where:

the terminal supports a full-duplex communication mode, the base station supports a half-duplex communication mode, and the terminal includes the full-duplex wireless transceiver according to the tenth possible implementation manner of the first aspect of the embodiments of the present invention or the eleventh possible implementation manner of the first aspect of the embodiments of the present invention; or the terminal supports a full-duplex communication mode, the base station supports a full-duplex communication mode, the terminal includes the full-duplex wireless transceiver according to the tenth possible implementation manner of the first aspect of the embodiments of the present invention or the eleventh possible implementation manner of the first aspect of the embodiments of the present invention, and the base station includes the full-duplex wireless transceiver according to the tenth possible implementation manner of the first aspect of the embodiments of the present invention or the eleventh possible implementation manner of the first aspect of the embodiments of the present invention; or the terminal supports a half-duplex communication mode, the base station supports a full-duplex communication mode, and the base station includes the full-duplex wireless transceiver according to the tenth possible implementation manner of the first aspect of the embodiments of the present invention or the eleventh possible implementation manner of the first aspect of the embodiments of the present invention.

In a first possible implementation manner of the third aspect of the embodiments of the present invention, when the terminal supports the full-duplex communication mode, the terminal includes the full-duplex wireless transceiver according to the tenth possible implementation manner of the first aspect of the embodiments of the present invention or the eleventh possible implementation manner of the first aspect of the embodiments of the present invention, where:

the terminal is configured to receive a request message that is used to request to measure each wireless self-interference channel of the terminal and that is sent by the base station;

the terminal is further configured to respond to the request message and measure each wireless self-interference channel so as to determine a quantity of adjustment submodules in a connected state in a cancellation signal generation module that is between a pair of a transmit antenna and a receive antenna;

the terminal is further configured to determine a maximum quantity of full-duplex multiple-input multiple-output antennas that are supported by the terminal and send the maximum quantity to the base station, so that the base station determines the full-duplex communication mode of the terminal according to the maximum quantity and sends the full-duplex communication mode to the terminal; and the terminal is further configured to receive the full-duplex communication mode sent by the base station, and configure quantities of transmit antennas and receive antennas of the terminal according to the full-duplex communication mode, where the quantity of adjustment submodules in the connected state in the cancellation signal generation module that is between the pair of the transmit antenna and the receive antenna is determined by energy that is corresponding to each path in the wireless self-interference channel between the pair of the transmit antenna and the receive antenna and that is measured by the terminal.

A fourth aspect of embodiments of the present invention discloses a wireless communication method, including:

modulating a transmit digital signal into a first radio frequency signal, and outputting the first radio frequency signal to a transmit antenna;

performing, under control of a pre-generated control signal, phase adjustment and amplitude adjustment on the first radio frequency signal, and obtaining a cancellation signal; and performing self-interference cancellation on a second radio frequency signal received from a radio air interface by using a receive antenna and the cancellation signal so as to generate a third radio frequency signal obtained after self-interference cancellation, and demodulating the third radio frequency signal into a receive digital signal.

In a first possible implementation manner of the fourth aspect of the embodiments of the present invention, before the performing, under control of a pre-generated control signal, phase adjustment and amplitude adjustment on the first radio frequency signal, the method further includes:

computing a channel characteristic of a wireless self-interference channel between the transmit antenna and the receive antenna; and generating the control signal according to the channel characteristic.

With reference to the fourth aspect of the embodiments of the present invention or the first possible implementation manner of the fourth aspect of the embodiments of the present invention, in a second possible implementation manner of the fourth aspect of the embodiments of the present invention, before the obtaining a cancellation signal, the method further includes:

adjusting a delay of the first radio frequency signal according to the control signal.

In the embodiments of the present invention, after modulating a transmit digital signal into a first radio frequency signal, a full-duplex wireless transceiver outputs the first radio frequency signal to a transmit antenna, then performs, under control of a pre-generated control signal, phase adjustment and amplitude adjustment on the first radio frequency signal and obtains a cancellation signal, performs self-interference cancellation on a second radio frequency signal received from a radio air interface by using a receive antenna and the cancellation signal so as to generate a third radio frequency signal obtained after self-interference cancellation, and finally demodulates the third radio frequency signal into a receive digital signal. According to the embodiments of the present invention, phase adjustment and amplitude adjustment may be performed, according to a channel characteristic of a wireless self-interference channel, on a radio frequency signal transmitted by a transmit antenna so as to generate a cancellation signal, and self-interference cancellation is performed on a radio frequency signal received by a receive antenna and the cancellation signal, which reduces interference of the sent radio frequency signal to the received radio frequency signal in a full-duplex communication mode, and improves reliability of mobile communications.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiments of the present invention disclose a wireless communications method and system, and a full-duplex wireless transceiver. According to the embodiments of the present invention, phase adjustment and amplitude adjustment may be performed, according to a channel characteristic of a wireless self-interference channel, on a radio frequency signal transmitted by a transmit antenna so as to generate a cancellation signal, and self-interference cancellation is performed on a radio frequency signal received by a receive antenna and the cancellation signal, which reduces interference of the sent radio frequency signal to the received radio frequency signal in a full-duplex communication mode, and improves reliability of mobile communications.

Figure 1:
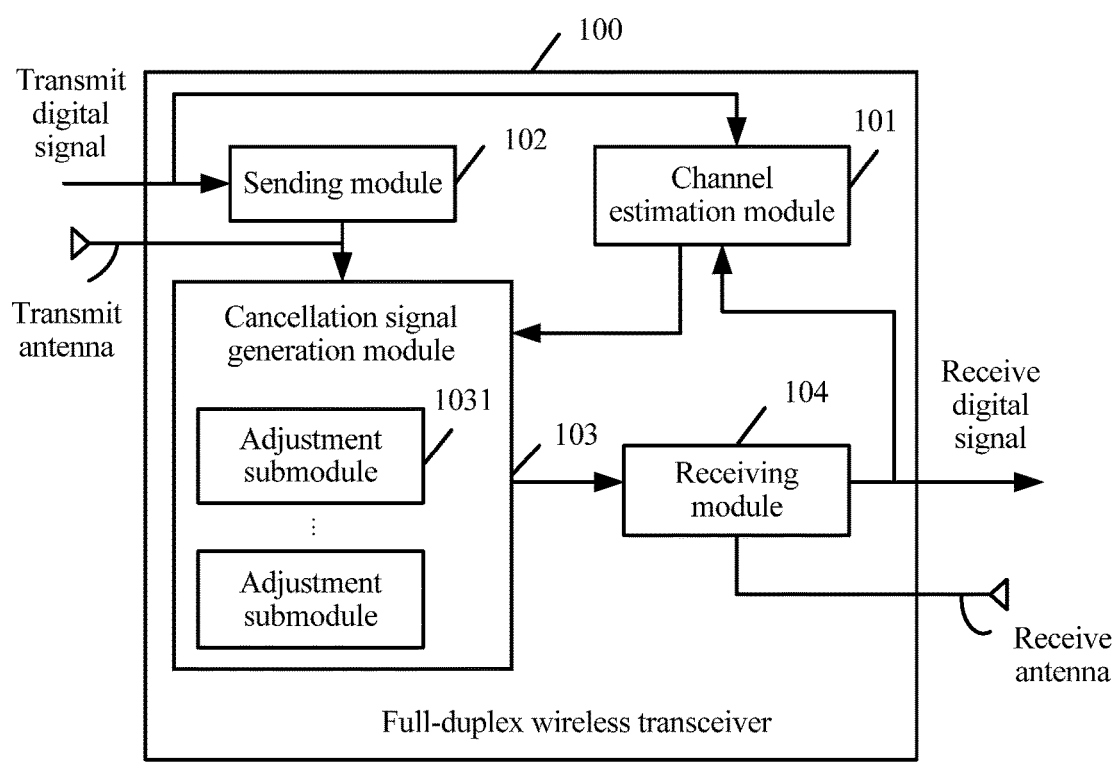
FIG. 1 is a schematic structural diagram of a full-duplex wireless transceiver according to an embodiment of the present invention.

Referring to FIG. 1, FIG. 1 is a schematic structural diagram of a full-duplex wireless transceiver according to an embodiment of the present invention. As shown in FIG. 1, the full-duplex wireless transceiver 100 includes a channel estimation module 101, a sending module 102, a cancellation signal generation module 103, and a receiving module 104, where the cancellation signal generation module 103 includes at least one adjustment submodule (for example, an adjustment submodule 1031 shown in FIG. 1).

An output end of the sending module 102 is connected to an input end of the cancellation signal generation module 103 and a transmit antenna, an output end of the cancellation signal generation module 103 is connected to a first input end of the receiving module 104, a second input end of the receiving module 104 is connected to a receive antenna, a control end of the cancellation signal generation module 103 is connected to an output end of the channel estimation module 101, a first input end of the channel estimation module 101 is connected to an output end of the receiving module 104, and a second input end of the channel estimation module 101 is connected to an input end of the sending module 102.

The channel estimation module 101 is configured to compute a channel characteristic of a wireless self-interference channel between the transmit antenna and the receive antenna, generate a control signal according to the channel characteristic, and output the control signal to the adjustment submodule.

In this embodiment of the present invention, the control signal may include a first control signal for phase adjustment and a second control signal for amplitude adjustment.

The sending module 102 is configured to modulate an input transmit digital signal into a first radio frequency signal, and output the first radio frequency signal to the adjustment submodule and the transmit antenna.

The adjustment submodule is configured to receive the first radio frequency signal and the control signal and perform, under control of the control signal, phase adjustment and amplitude adjustment on the first radio frequency signal, and obtain a cancellation signal.

The adjustment submodule is further configured to output the cancellation signal to the receiving module 104.

The receiving module 104 is configured to receive the cancellation signal and receive a second radio frequency signal from a radio air interface, and perform self-interference cancellation on the second radio frequency signal and the cancellation signal, so as to generate a third radio frequency signal obtained after self-interference cancellation.

The receiving module 104 is further configured to demodulate the third radio frequency signal into a receive digital signal.

As an optional implementation manner, the receiving module 104 may further be configured to perform self-interference cancellation on the third radio frequency signal in a digital domain, and demodulate the third radio frequency signal obtained after self-interference cancellation in the digital domain into a receive digital signal.

In this embodiment of the present invention, the wireless self-interference channel between the transmit antenna and the receive antenna includes the following three scenarios:

1. The transmit antenna and the receive antenna share an antenna. In this case, a delay difference between the first radio frequency signal and the second radio frequency signal is almost zero, and the cancellation signal generation module 103 only needs to perform, under control of the control signal, phase adjustment and amplitude adjustment on the first radio frequency signal.

2. When a line of sight exists between the transmit antenna and the receive antenna, and a line of sight d between the transmit antenna and the receive antenna divided by a propagation velocity v of the first radio frequency signal in the radio air interface is far greater than a reciprocal of a signal bandwidth B, a delay of a signal may be equivalent to a phase rotation. In this case, the cancellation signal generation module 103 only needs to perform, under control of the control signal, phase adjustment and amplitude adjustment on the first radio frequency signal. Using one input and one output as an example, it is assumed that a transmit digital signal after digital-to-analog conversion is $s(t)$, and a first radio frequency signal generated after $s(t)$ undergoes carrier modulation at a frequency of $f_c$ is $s(t)e^{j2\pi f_c t}$. The wireless self-interference channel may be equivalent to:

$$h(t) = \sum_{i=1}^{N} h_i \delta(t - \tau_i).$$

In addition, a signal that reaches the receive antenna after the first radio frequency signal passes through the wireless self-interference channel is $s(t)e^{j2\pi f_c t}$, where "*" indicates convolution. Because first path energy of the wireless self-interference channel is relatively great, the wireless self-interference channel may approximately be $h(t) \approx h_1 \delta(t - \tau_1)$, and the first radio frequency signal that passes through the wireless self-interference channel and that is received by the receive antenna is $h_1 s(t-\tau_1) e^{j2\pi f_c (t-\tau_1)}$. When the line of sight d between the transmit antenna and the receive antenna divided by the propagation velocity v of the first radio frequency signal in the radio air interface is far greater than the reciprocal of the signal bandwidth B, it may be considered that $s(t) \approx s(t-\tau_1)$, and the first radio frequency signal that passes through the wireless self-interference channel and that is received by the receive antenna is $h_1 s(t) e^{j2\pi f_c (t-\tau_1)} = s(t) e^{j2\pi f_c t} |h_1| e^{j(\theta_1 - 2\pi f_c \tau_1)}$, where $|h_1|$ is a channel attenuation coefficient of the wireless self-interference channel that needs to be estimated by the channel estimation module 101 so as to perform amplitude adjustment on the first radio frequency signal, and $(\theta_1 - 2\pi f_c \tau_1)$ is a phase that needs to be estimated by the channel estimation module 101 so as to perform phase adjustment on the first radio frequency signal. Conversely, the phase may also be equivalent to a delay, and if a value of $(\theta_1 - 2\pi f_c \tau_1)$ is $0\text{-}2\pi$, a delay equivalent to $(\theta_1 - 2\pi f_c \tau_1)$ is $(\theta_1 / 2\pi f_c - \tau_1)$.

3. When a line of sight exists between the transmit antenna and the receive antenna, and a difference Δd of lines of sight between the transmit antenna and two receive antennas divided by a propagation velocity v of the first radio frequency signal in the radio air interface is far greater than a reciprocal of a signal bandwidth B, a delay difference may be equivalent to a phase rotation, or a delay is equivalent to a phase.

In this embodiment of the present invention, because multiple paths exist on the wireless self-interference channel between the transmit antenna and the receive antenna, to match the multiple paths, the sending module 102 needs to output the first radio frequency signal to one or more adjustment submodules included in the cancellation signal generation module 103, and finally overlaps signals that are output by all adjustment submodules receiving the first radio frequency signal, so as to generate a cancellation signal.

Figure 4:
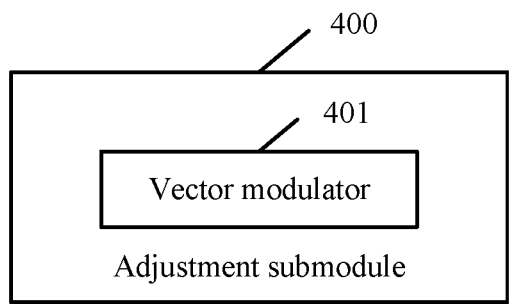
FIG. 4 is a schematic structural diagram of an adjustment submodule according to an embodiment of the present invention.

As an optional implementation manner, the adjustment submodule that is configured to perform phase adjustment and amplitude adjustment on the first radio frequency signal in the cancellation signal generation module 103 may include a vector modulator, and the adjustment submodule that is configured to perform phase adjustment and amplitude adjustment on the first radio frequency signal may be an adjustment submodule 400 shown in FIG. 4. FIG. 4 is a schematic structural diagram of an adjustment submodule according to an embodiment of the present invention. As shown in FIG. 4, the adjustment submodule 400 may include a vector modulator 401. An input end of the vector modulator 401 is connected to an output end of the sending module 102, an output end of the vector modulator 401 is connected to a first input end of the receiving module 104, and a control end of the vector modulator 401 is connected to an output end of the channel estimation module 101.

The vector modulator 401 is configured to adjust the phase and the amplitude of the first radio frequency signal respectively according to the first control signal and the second control signal included in the control signal so as to obtain the cancellation signal, and output the cancellation signal to the first input end of the receiving module 104.

Figure 10:
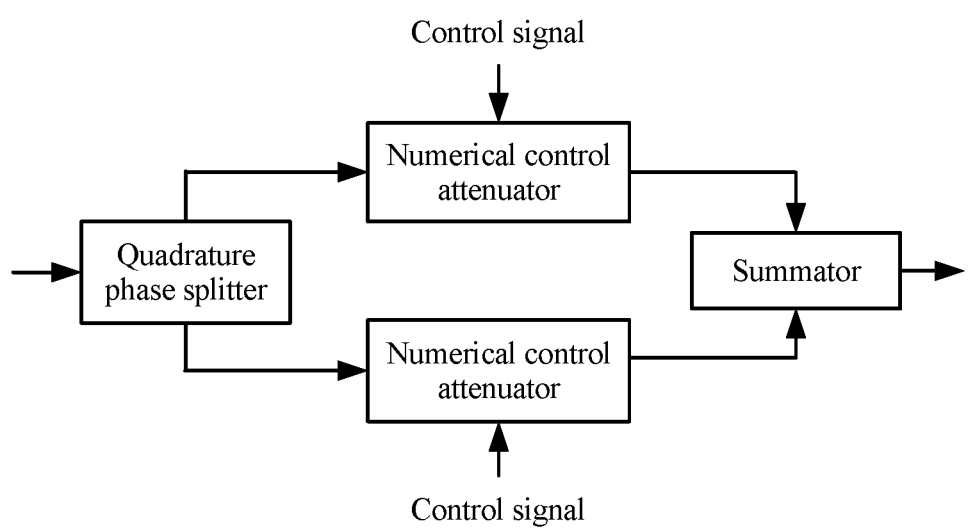
FIG. 10 is a schematic structural diagram of a vector modulator according to an embodiment of the present invention.

In this embodiment of the present invention, the vector modulator 401 may be shown in FIG. 10. FIG. 10 is a schematic structural diagram of a vector modulator according to an embodiment of the present invention. As shown in FIG. 10, the vector modulator includes one quadrature phase splitter, two numerical control attenuators, and one summator.

An input end of the quadrature phase splitter is connected to the output end of the sending module 102, two output ends of the quadrature phase splitter are respectively connected to an input end of a first numerical control attenuator and an input end of a second numerical control attenuator, a control end of the first numerical control attenuator and a control end of the second numerical control attenuator are separately connected to the output end of the channel estimation module 101, an output end of the first numerical control attenuator is connected to a first input end of the summator, an output end of the second numerical control attenuator is connected to a second input end of the summator, and an output end of the summator is connected to the first input end of the receiving module.

In this embodiment of the present invention, using a vector modulator may increase adjustable digits of a phase.

Figure 5:
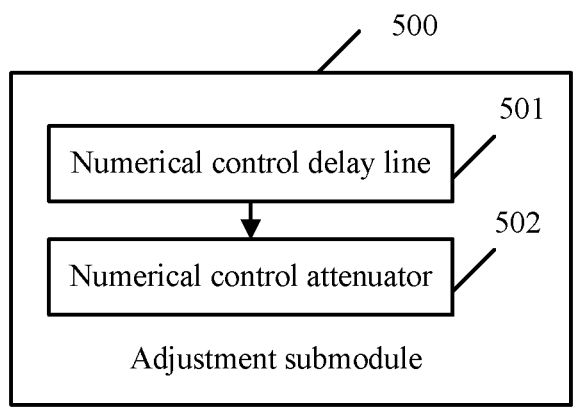
FIG. 5 is a schematic structural diagram of another adjustment submodule according to an embodiment of the present invention.

As an optional implementation manner, the adjustment submodule that is configured to perform phase adjustment and amplitude adjustment on the first radio frequency signal in the cancellation signal generation module 103 may include a numerical control attenuator and a numerical control delay line, and the adjustment submodule that is configured to perform phase adjustment and amplitude adjustment on the first radio frequency signal may be an adjustment submodule 500 shown in FIG. 5. FIG. 5 is a schematic structural diagram of another adjustment submodule according to an embodiment of the present invention. As shown in FIG. 5, the adjustment submodule 500 may include a numerical control delay line 501 and a numerical control attenuator 502. An input end of the numerical control delay line 501 is connected to the output end of the sending module 102, an output end of the numerical control delay line 501 is connected to an input end of the numerical control attenuator 502, a control end of the numerical control delay line 501 and a control end of the numerical control attenuator 502 are separately connected to the output end of the channel estimation module 101, and an output end of the numerical control attenuator 502 is connected to the first input end of the receiving module 104. The numerical control delay line 501 is a numerical control small delay line, and the numerical control delay line 501 may control a delay at a picosecond level and be configured to match a phase change.

The numerical control delay line 501 is configured to adjust the phase of the first radio frequency signal according to the first control signal included in the control signal so as to obtain the phase-adjusted first radio frequency signal, and output the first radio frequency signal to the numerical control attenuator 502.

The numerical control attenuator 502 is configured to adjust the amplitude of the first radio frequency signal according to the second control signal included in the control signal so as to generate the cancellation signal, and output the cancellation signal to the first input end of the receiving module 104.

As an optional implementation manner, the control signal may further include a third control signal for delay adjustment, and the at least one adjustment submodule in the several adjustment submodules included in the cancellation signal generation module 103 may further be configured to perform, under control of the third control signal, delay adjustment on the first radio frequency signal.

Figure 6:
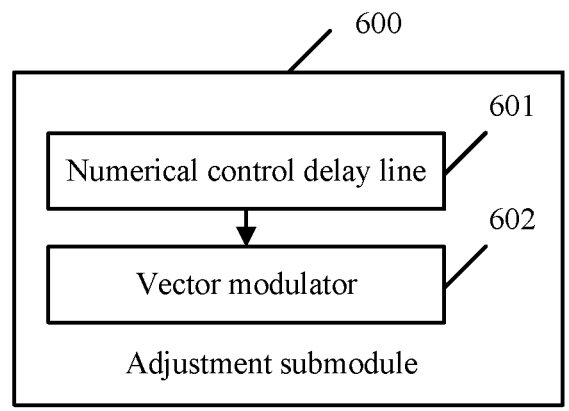
FIG. 6 is a schematic structural diagram of yet another adjustment submodule according to an embodiment of the present invention.

As an optional implementation manner, the adjustment submodule that is configured to perform phase adjustment, amplitude adjustment, and delay adjustment on the first radio frequency signal in the cancellation signal generation module 103 may include a vector modulator and a numerical control delay line, and the adjustment submodule that is configured to perform phase adjustment, amplitude adjustment, and delay adjustment on the first radio frequency signal may be an adjustment submodule 600 shown in FIG. 6. FIG. 6 is a schematic structural diagram of yet another adjustment submodule according to an embodiment of the present invention. As shown in FIG. 6, the adjustment submodule 600 may include a numerical control delay line 601 and a vector modulator 602. An input end of the numerical control delay line 601 is connected to the output end of the sending module 102, an output end of the numerical control delay line 601 is connected to an input end of the vector modulator 602, a control end of the numerical control delay line 601 and a control end of the vector modulator 602 are separately connected to the output end of the channel estimation module 101, and an output end of the vector modulator 602 is connected to the first input end of the receiving module 104. The numerical control delay line 601 is a numerical control large delay line, and the numerical control delay line 601 may control a delay at a nanosecond level and be configured to match a delay change.

The numerical control delay line 601 is configured to adjust the delay of the first radio frequency signal according to the third control signal included in the control signal so as to obtain the delay-adjusted first radio frequency signal, and output the first radio frequency signal to the vector modulator 602.

The vector modulator 602 is configured to adjust the phase and the amplitude of the first radio frequency signal respectively according to the first control signal and the second control signal included in the control signal so as to obtain the cancellation signal, and output the cancellation signal to the first input end of the receiving module 104.

In this embodiment of the present invention, multiple adjustment submodules between one transmit antenna and multiple receive antennas may share one numerical control delay line 601, which may save costs and reduce a volume of a full-duplex wireless transceiver 100. Using one transmit antenna and two receive antennas as an example, it is assumed that the cancellation signal generation module 103 includes eight adjustment submodules. A first adjustment submodule in the cancellation signal generation module between the transmit antenna and a first receive antenna, and a first adjustment submodule in the cancellation signal generation module between the transmit antenna and a second receive antenna share a first numerical control delay line. A second adjustment submodule in the cancellation signal generation module between the transmit antenna and the first receive antenna, and a second adjustment submodule in the cancellation signal generation module between the transmit antenna and the second receive antenna share a second numerical control delay line, and so on.

Figure 7:
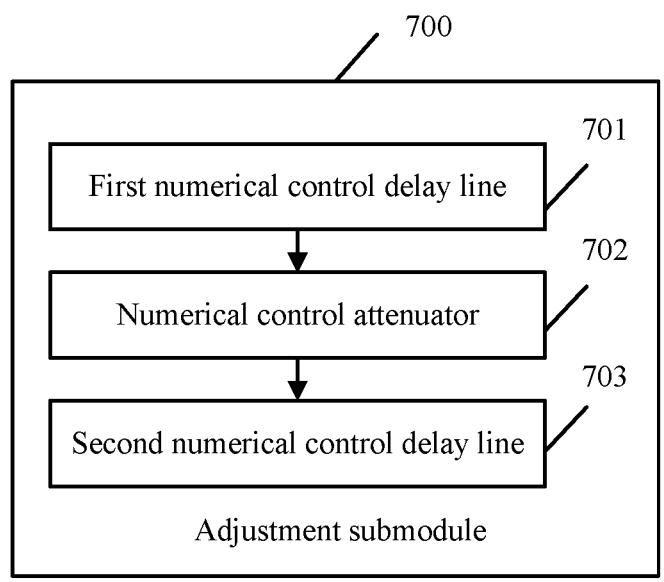
FIG. 7 is a schematic structural diagram of still another adjustment submodule according to an embodiment of the present invention.

As an optional implementation manner, the adjustment submodule that is configured to perform phase adjustment, amplitude adjustment, and delay adjustment on the first radio frequency signal in the cancellation signal generation module 103 may include a first numerical control delay line, a numerical control attenuator, and a second numerical control delay line. The adjustment submodule that is configured to perform phase adjustment, amplitude adjustment, and delay adjustment on the first radio frequency signal may be an adjustment submodule 700 shown in FIG. 7. FIG. 7 is a schematic structural diagram of still another adjustment submodule according to an embodiment of the present invention. As shown in FIG. 7, the adjustment submodule 700 may include a first numerical control delay line 701, a numerical control attenuator 702, and a second numerical control delay line 703. An input end of the first numerical control delay line 701 is connected to the output end of the sending module 102, an output end of the first numerical control delay line 701 is connected to an input end of the numerical control attenuator 702, a control end of the first numerical control delay line 701, a control end of the numerical control attenuator 702, and a control end of the second numerical control delay line 703 are separately connected to the output end of the channel estimation module 101, an output end of the numerical control attenuator 702 is connected to an input end of the second numerical control delay line 703, and an output end of the second numerical control delay line 703 is connected to the first input end of the receiving module 104. The first numerical control delay line 701 is a numerical control small delay line and the second numerical control delay line 703 is a numerical control large delay line. In addition, the first numerical control delay line 701 may control a delay at a picosecond level and be configured to match a phase change. The second numerical control delay line 703 may control a delay at a nanosecond level and be configured to match a delay change.

The first numerical control delay line 701 is configured to adjust the phase of the first radio frequency signal according to the first control signal included in the control signal so as to obtain the phase-adjusted first radio frequency signal, and output the first radio frequency signal to the numerical control attenuator 702.

The numerical control attenuator 702 is configured to adjust the amplitude of the first radio frequency signal according to the second control signal included in the control signal so as to obtain the amplitude-adjusted first radio frequency signal, and output the first radio frequency signal to the second numerical control delay line 703.

The second numerical control delay line 703 is configured to adjust the delay of the first radio frequency signal according to the third control signal included in the control signal so as to generate the cancellation signal, and output the cancellation signal to the first input end of the receiving module 104.

In this embodiment of the present invention, multiple adjustment submodules between one transmit antenna and multiple receive antennas may share one second numerical control delay line 703, which may save costs and reduce a volume of a full-duplex wireless transceiver 100.

Figure 8:
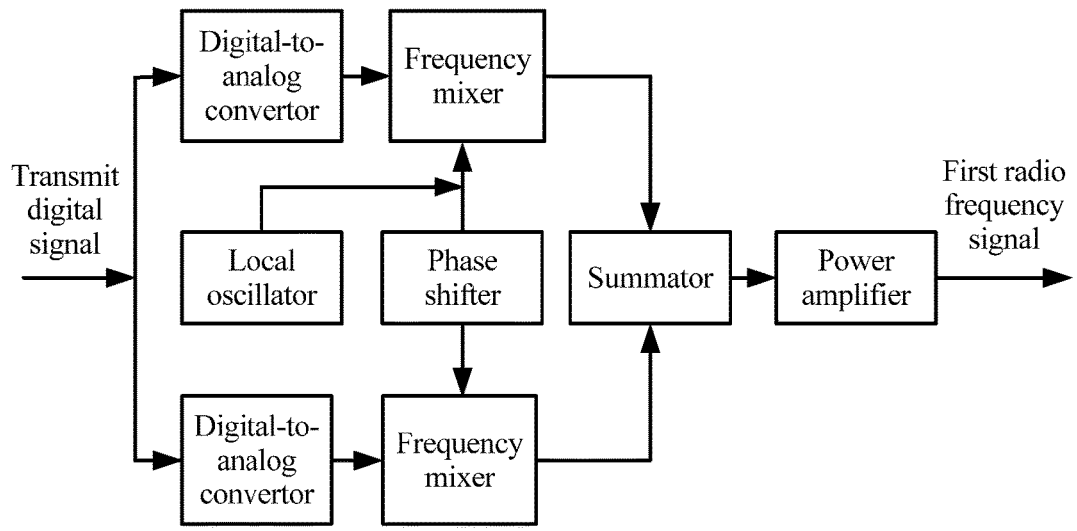
FIG. 8 is a schematic structural diagram of a sending module according to an embodiment of the present invention.

As an optional implementation manner, the sending module 102 may be shown in FIG. 8. FIG. 8 is a schematic structural diagram of a sending module according to an embodiment of the present invention. As shown in FIG. 8, the sending module 102 may include two digital-to-analog converters, one local oscillator, one phase shifter, two frequency mixers, one summator, and one power amplifier.

An input end of a first digital-to-analog converter is connected to an input end of a second digital-to-analog converter, and an output end of the first digital-to-analog converter is connected to a first input end of a first frequency mixer. A second input end of the first frequency mixer is separately connected to an output end of the local oscillator and a first output end of the phase shifter, and an output end of the first frequency mixer is connected to a first input end of the summator. An output end of the second digital-to-analog converter is connected to a first input end of a second frequency mixer, a second input end of the second frequency mixer is connected to a second output end of the phase shifter, and an output end of the second frequency mixer is connected to a second input end of the summator. An output end of the summator is connected to an input end of the power amplifier, and an output end of the power amplifier is separately connected to the transmit antenna and an input end of the adjustment submodule in the cancellation signal generation module 103. The input end of the first digital-to-analog converter is configured to input the transmit digital signal.

Figure 9:
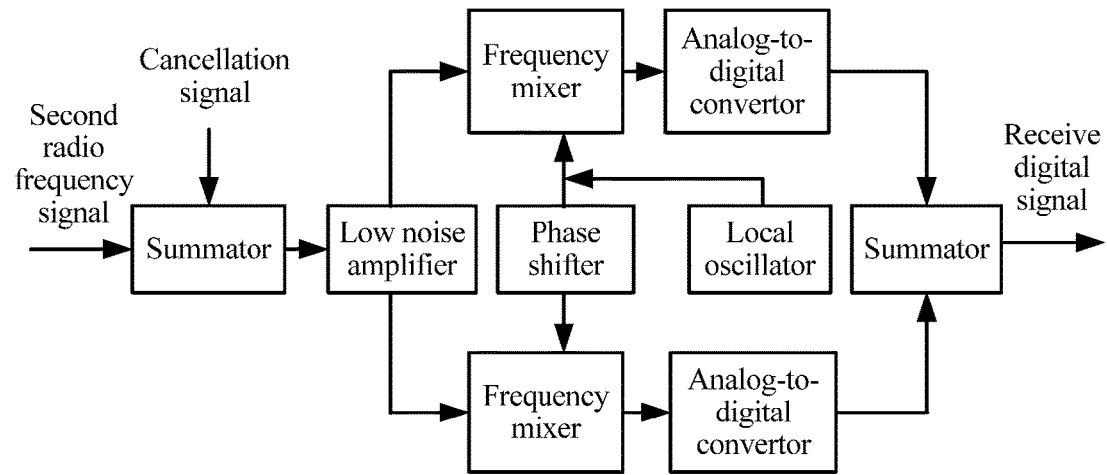
FIG. 9 is a schematic structural diagram of a receiving module according to an embodiment of the present invention.

As an optional implementation manner, the receiving module 104 may be shown in FIG. 9. FIG. 9 is a schematic structural diagram of a receiving module according to an embodiment of the present invention. As shown in FIG. 9, the receiving module 104 may include two analog-to-digital converters, one local oscillator, two frequency mixers, one phase shifter, one low noise amplifier, and two summators.

A first input end of a first summator is connected to an output end of the adjustment submodule of the cancellation signal generation module 103, a second input end of the first summator is connected to the receive antenna, and an output end of the first summator is connected to an input end of the low noise amplifier. An output end of the low noise amplifier is separately connected to a first input end of a first frequency mixer and a first input end of a second frequency mixer, and a second input end of the first frequency mixer is separately connected to a first output end of the phase shifter and an output end of the local oscillator. An output end of the first frequency mixer is connected to an input end of a first analog-to-digital converter, and an output end of the first analog-to-digital converter is connected to a first input end of a second summator. A second input end of the second frequency mixer is connected to a second output end of the phase shifter, and an output end of the second frequency mixer is connected to an input end of a second analog-to-digital converter. An output end of the second analog-to-digital converter is connected to a second input end of the second summator, and an output end of the second summator is connected to the first input end of the channel estimation module 101. The second summator is configured to output the receive digital signal.

According to this embodiment of the present invention, phase adjustment and amplitude adjustment, or phase adjustment, amplitude adjustment, and delay adjustment may be performed, according to a channel characteristic of a wireless self-interference channel, on a radio frequency signal that needs to be transmitted by a transmit antenna so as to generate a cancellation signal, and self-interference cancellation is performed on a radio frequency signal received by a receive antenna and the cancellation signal, which reduces interference of the sent radio frequency signal to the received radio frequency signal in a full-duplex communication mode, and improves reliability of mobile communications.

Figure 2:
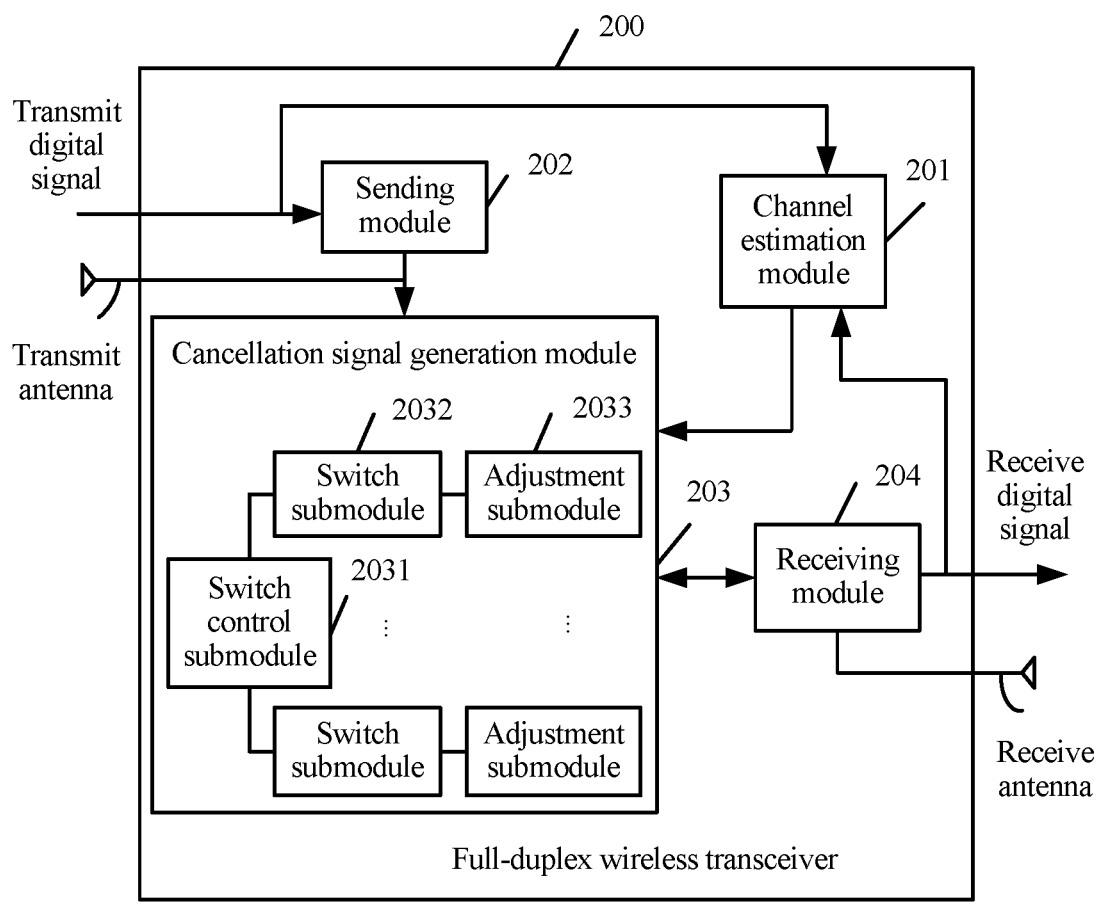
FIG. 2 is a schematic structural diagram of another full-duplex wireless transceiver according to an embodiment of the present invention.

Referring to FIG. 2, FIG. 2 is a schematic structural diagram of another full-duplex wireless transceiver according to an embodiment of the present invention. As shown in FIG. 2, the full-duplex wireless transceiver 200 may include a channel estimation module 201, a sending module 202, a cancellation signal generation module 203, and a receiving module 204, where the cancellation signal generation module 203 includes at least one adjustment submodule (for example, an adjustment submodule 2033 shown in FIG. 2).

An output end of the sending module 202 is connected to an input end of the cancellation signal generation module 203 and a transmit antenna, an output end of the cancellation signal generation module 203 is connected to a first input end of the receiving module 204, a second input end of the receiving module 204 is connected to a receive antenna, a control end of the cancellation signal generation module 203 is connected to an output end of the channel estimation module 201, a first input end of the channel estimation module 201 is connected to an output end of the receiving module 204, and a second input end of the channel estimation module 201 is connected to an input end of the sending module 202.

The channel estimation module 201 is configured to compute a channel characteristic of a wireless self-interference channel between the transmit antenna and the receive antenna, generate a control signal according to the channel characteristic, and output the control signal to the adjustment submodule.

In this embodiment of the present invention, the control signal may include a first control signal for phase adjustment and a second control signal for amplitude adjustment.

The sending module 202 is configured to modulate an input transmit digital signal into a first radio frequency signal, and output the first radio frequency signal to the adjustment submodule and the transmit antenna.

The adjustment submodule is configured to receive the first radio frequency signal and the control signal and perform, under control of the control, signal phase adjustment and amplitude adjustment on the first radio frequency signal, and obtain a cancellation signal.

The adjustment submodule is further configured to output the cancellation signal to the receiving module 204.

The receiving module 204 is configured to receive the cancellation signal and receive a second radio frequency signal from a radio air interface, and perform self-interference cancellation on the second radio frequency signal and the cancellation signal, so as to generate a third radio frequency signal obtained after self-interference cancellation.

The receiving module 204 is further configured to demodulate the third radio frequency signal into a receive digital signal.

As an optional implementation manner, the receiving module 204 may further be configured to perform self-interference cancellation on the third radio frequency signal in a digital domain, and demodulate the third radio frequency signal obtained after self-interference cancellation in the digital domain into a receive digital signal.

In this embodiment of the present invention, the wireless self-interference channel between the transmit antenna and the receive antenna includes the following three scenarios:

1. The transmit antenna and the receive antenna share an antenna. In this case, a delay difference between the first radio frequency signal and the second radio frequency signal is almost zero, and the cancellation signal generation module 203 only needs to perform, under control of the control signal, phase adjustment and amplitude adjustment on the first radio frequency signal.

2. When a line of sight exists between the transmit antenna and the receive antenna, and a line of sight d between the transmit antenna and the receive antenna divided by a propagation velocity v of the first radio frequency signal in the radio air interface is far greater than a reciprocal of a signal bandwidth B, a delay of a signal may be equivalent to a phase rotation. In this case, the cancellation signal generation module 203 only needs to perform, under control of the control signal, phase adjustment and amplitude adjustment on the first radio frequency signal. Using one input and one output as an example, it is assumed that a transmit digital signal after digital-to-analog conversion is s(t), and a first radio frequency signal generated after s(t) undergoes carrier modulation at a frequency of $f_c$ is $s(t)e^{j2\pi f_c t}$. The wireless self-interference channel may be equivalent to:

$$h(t)=\Sigma_{i=1}^{N}h_i\delta(t-\tau_i).$$

In addition, a signal that reaches the receive antenna after the first radio frequency signal passes through the wireless self-interference channel is $s(t)e^{j2\pi f_c t}*h(t)$, where "*" indicates convolution. Because first path energy of the wireless self-interference channel is relatively great, the wireless self-interference channel may approximately be $h(t) \approx h_1\delta(t-\tau_1)$, and the first radio frequency signal that passes through the wireless self-interference channel and that is received by the receive antenna is $h_1 s(t-\tau_1)e^{j2\pi f_c(t-\tau_1)}$. When the line of sight d between the transmit antenna and the receive antenna divided by the propagation velocity v of the first radio frequency signal in the radio air interface is far greater than the reciprocal of the signal bandwidth B, it may be considered that $s(t) \approx s(t-\tau_1)$, and the first radio frequency signal that passes through the wireless self-interference channel and that is received by the receive antenna is $h_1 s(t) e^{j2\pi f_c(t-\tau_1)} = s(t) e^{j2\pi f_c t} |h_1| e^{j(\theta_1 - 2\pi f_c \tau_1)}$, where $|h_1|$ is a channel attenuation coefficient of the wireless self-interference channel that needs to be estimated by the channel estimation module 201 so as to perform amplitude adjustment on the first radio frequency signal, and $(\theta_1 - 2\pi f_c \tau_1)$ is a phase that needs to be estimated by the channel estimation module 201 so as to perform phase adjustment on the first radio frequency signal. Conversely, the phase may also be equivalent to a delay, and if a value of $(\sigma_1 - 2\pi f_c \tau_1)$ is 0-2π, a delay equivalent to is $(\theta_1 - 2\pi f_c \tau_1)$ is $(\theta_1/2\pi f_c - \tau_1)$.

3. When a line of sight exists between the transmit antenna and the receive antenna, and a difference Δd of lines of sight between the transmit antenna and two receive antennas divided by a propagation velocity v of the first radio frequency signal in the radio air interface is far greater than a reciprocal of a signal bandwidth B, a delay difference may be equivalent to a phase rotation, or a delay is equivalent to a phase.

In this embodiment of the present invention, because multiple paths exist on the wireless self-interference channel between the transmit antenna and the receive antenna, to match the multiple paths, the sending module 202 needs to output the first radio frequency signal to one or more adjustment submodules included in the cancellation signal generation module 203, and finally overlaps signals that are output by all adjustment submodules receiving the first radio frequency signal, so as to generate a cancellation signal.

As an optional implementation manner, the cancellation signal generation module 203 may further include a switch control submodule 2031 and switch submodules (for example, an adjustment submodule 2033 and a switch submodule 2032 corresponding to the adjustment submodule 2033 in FIG. 2) that are in a one-to-one correspondence with several adjustment submodules.

The switch submodule is configured to control a work status of the adjustment submodule between a pair of the first radio frequency signal and the second radio frequency signal, where the adjustment submodule is corresponding to the switch submodule, and the work status may include a connected state or a non-connected state.

The switch control submodule 2031 is configured to determine a quantity of adjustment submodules in the connected state in the several adjustment submodules by using a predefined criterion. That is, the switch control submodule 2031 may control the quantity of adjustment submodules in the connected state by using a switch submodule. The switch submodule may be a single-controlled switch or may be a switch circuit, which is not limited in this embodiment of the present invention.

In this embodiment of the present invention, the switch control submodule 2031 may dynamically select the quantity of adjustment submodules in the connected state according to a specific situation, which may improve precision of self-interference cancellation. In addition, a proper quantity of adjustment submodules may reduce a volume of a full-duplex transceiver and reduce costs.

As an optional implementation manner, there may be three manners in which the switch control submodule 2031 determines the quantity of adjustment submodules in the connected state in the several adjustment submodules by using a predefined criterion.

Manner 1:

Energy corresponding to each path in N paths of the wireless self-interference channel is obtained from the channel estimation module 201; M paths are then determined from the N paths, so that a ratio of a first sum of energy corresponding to each path in the M paths to a second sum of energy corresponding to each path in remaining (N-M) paths of the N paths apart from the M paths is greater than a preset first threshold, where the energy corresponding to any path in the M paths is greater than the energy corresponding to any path in the (N-M) paths, and M is a positive integer and M is the quantity of adjustment submodules in the connected state in the several adjustment submodules determined by the switch control submodule 2031, and N is greater than M. For example, it is assumed that the channel estimation module 201 estimates that the wireless self-interference channel between a pair of the transmit antenna and the receive antenna has eight paths and an amplitude, a phase, and a delay that are corresponding to each path, and computes energy of each path according to the amplitude corresponding to each path. After obtaining the energy of each path from the channel estimation module 201, the switch control submodule 2031 may arrange the energy of each path in ascending or descending order (assuming that the energy is arranged in descending order) according to an energy value of each path, and then the switch control submodule 2031 obtains a ratio of a first energy value to a sum of the remaining seven energy values and converts the ratio into a decibel value. The decibel value is compared with the preset first threshold (such as 50 db), and if the decibel value is greater than the preset first threshold, M is 1, that is, the quantity of adjustment submodules in the connected state determined by the switch control submodule 2031 is 1; if the decibel value is less than the preset first threshold, the switch control submodule 2031 obtains a ratio of a sum of first two energy values to a sum of the remaining six energy values and converts the ratio into a decibel value. The decibel value is compared with the preset first threshold (such as 50 db), and if the decibel value is greater than the preset first threshold, M is 2; if the decibel value is less than the preset first threshold, the switch control submodule 2031 obtains a ratio of a sum of first three energy values to a sum of the remaining five energy values and converts the ratio into a decibel value, and so on, until a decibel value converted from a ratio of a sum of first M energy values obtained by the switch control submodule 2031 to a sum of the remaining (8-M) energy values is greater than the preset first threshold. M is the quantity of adjustment submodules in the connected state in the several adjustment submodules determined by the switch control submodule 2031. The switch control submodule 2031 adjusts a parameter of the M adjustment submodules in the connected state according to a parameter of the M paths.

Manner 2:

The switch control submodule 2031 obtains a first received signal strength indicator $RSSI_1$ of the second radio frequency signal and a second received signal strength indicator $RSSI_2$ of the third radio frequency signal. When the second received signal strength indicator $RSSI_2$ of the third radio frequency signal is greater than a preset second threshold or when a difference between the first received signal strength indicator $RSSI_1$ of the second radio frequency signal and the second received signal strength indicator $RSSI_2$ of the third radio frequency signal is less than a preset third threshold, the quantity of adjustment submodules in the connected state is increased. When the difference between the first received signal strength indicator $RSSI_1$ of the second radio frequency signal and the second received signal strength indicator $RSSI_2$ of the third radio frequency signal is greater than a preset fourth threshold, the quantity of adjustment submodules in the connected state is decreased. Three conditions restrict each other so that the switch control submodule 2031 can finally determine the quantity of adjustment submodules in the connected state. For example, when the second received signal strength indicator $RSSI_2$ of the third radio frequency signal is greater than the preset second threshold (such as 50 dbm), the switch control submodule 2031 may first determine an adjustment submodule in the connected state, and the switch control submodule 2031 may then determine whether the difference between the first received signal strength indicator $RSSI_1$ of the second radio frequency signal and the second received signal strength indicator $RSSI_2$ of the third radio frequency signal is less than the preset third threshold (such as 40 db). When the difference between the first received signal strength indicator $RSSI_1$ of the second radio frequency signal and the second received signal strength indicator $RSSI_2$ of the third radio frequency signal is less than the preset third threshold, the switch control submodule 2031 increases the quantity of adjustment submodules in the connected state, and an increased quantity of adjustment submodules in the connected state may be one or two, which is not limited in this embodiment of the present invention. Then, the switch control submodule 2031 may determine whether the difference between the first received signal strength indicator $RSSI_1$ of the second radio frequency signal and the second received signal strength indicator $RSSI_2$ of the third radio frequency signal is greater than the preset fourth threshold (such as 70 db). When the difference between the first received signal strength indicator $RSSI_1$ of the second radio frequency signal and the second received signal strength indicator $RSSI_2$ of the third radio frequency signal is greater than the preset fourth threshold, the switch control submodule 2031 decreases the quantity of adjustment submodules in the connected state, and a decreased quantity of adjustment submodules in the connected state may be one or two, which is not limited in this embodiment of the present invention.

Manner 3:

A combination of manner 1 and manner 2, that is, the switch control submodule 2031 may first determine, in manner 1, a quantity of adjustment submodules that are initially in the connected state, and then finally determine, in manner 2, a quantity of adjustment submodules in the connected state.

As an optional implementation manner, the adjustment submodule that is configured to perform phase adjustment and amplitude adjustment on the first radio frequency signal in the cancellation signal generation module 203 may include a vector modulator, and the adjustment submodule that is configured to perform phase adjustment and amplitude adjustment on the first radio frequency signal may be an adjustment submodule 400 shown in FIG. 4, and the vector modulator may be a vector modulator shown in FIG. 10, which is not limited in this embodiment of the present invention. In this embodiment of the present invention, using a vector modulator may increase adjustable digits of a phase.

As an optional implementation manner, the adjustment submodule that is configured to perform phase adjustment and amplitude adjustment on the first radio frequency signal in the cancellation signal generation module 203 may include a numerical control attenuator and a numerical control delay line, and the adjustment submodule that is configured to perform phase adjustment and amplitude adjustment on the first radio frequency signal may be an adjustment submodule 500 shown in FIG. 5, which is not limited in this embodiment of the present invention.

As an optional implementation manner, the control signal may further include a third control signal for delay adjustment, and the at least one adjustment submodule in the several adjustment submodules included in the cancellation signal generation module 203 may further be configured to perform, under control of the third control signal, delay adjustment on the first radio frequency signal.

As an optional implementation manner, the adjustment submodule that is configured to perform phase adjustment, amplitude adjustment, and delay adjustment on the first radio frequency signal in the cancellation signal generation module 203 may include a vector modulator and a numerical control delay line. The adjustment submodule that is configured to perform phase adjustment, amplitude adjustment, and delay adjustment on the first radio frequency signal may be an adjustment submodule 600 shown in FIG. 6, which is not limited in this embodiment of the present invention. The numerical control delay line 601 is a numerical control large delay line, and the numerical control delay line 601 may control a delay at a nanosecond level and be configured to match a delay change. In addition, multiple adjustment submodules between one transmit antenna and multiple receive antennas may share one numerical control delay line 601, which may save costs and reduce a volume of a full-duplex wireless transceiver 200.

As an optional implementation manner, the adjustment submodule that is configured to perform phase adjustment, amplitude adjustment, and delay adjustment on the first radio frequency signal in the cancellation signal generation module 203 may include a first numerical control delay line, a numerical control attenuator, and a second numerical control delay line. The adjustment submodule that is configured to perform phase adjustment, amplitude adjustment, and delay adjustment on the first radio frequency signal may be an adjustment submodule 700 shown in FIG. 7, which is not limited in this embodiment of the present invention. The first numerical control delay line 701 is a numerical control small delay line, and the second numerical control delay line 703 is a numerical control large delay line. The first numerical control delay line 701 may control a delay at a picosecond level and be configured to match a phase change, and the second numerical control delay line 703 may control a delay at a nanosecond level and be configured to match a delay change. In addition, multiple adjustment submodules between one transmit antenna and multiple receive antennas may share one second numerical control delay line 703, which may save costs and reduce a volume of a full-duplex wireless transceiver 200.

As an optional implementation manner, the sending module 202 may be shown in FIG. 8, and the receiving module 204 may be shown in FIG. 9, which is not limited in this embodiment of the present invention.

According to this embodiment of the present invention, phase adjustment and amplitude adjustment, or phase adjustment, amplitude adjustment, and delay adjustment may be performed, according to a channel characteristic of a wireless self-interference channel between a transmit antenna and a receive antenna, on a radio frequency signal that needs to be transmitted by the transmit antenna so as to generate a cancellation signal, and self-interference cancellation may be performed on a radio frequency signal received by the receive antenna and the cancellation signal, which reduces interference of the sent radio frequency signal to the received radio frequency signal in a full-duplex communication mode, and improves reliability of mobile communications. In addition, using a vector modulator may increase adjustable digits for phase adjustment performed on a transmitted radio frequency signal and improve phase matching precision, and a full-duplex wireless transceiver can dynamically select a quantity of adjustment submodules in a connected state so that the full-duplex wireless transceiver dynamically matches the wireless self-interference channel, which ensures an effect of self-interference cancellation, and also reduces actually connected circuits and lowers power consumption of the full-duplex wireless transceiver.

Figure 3:
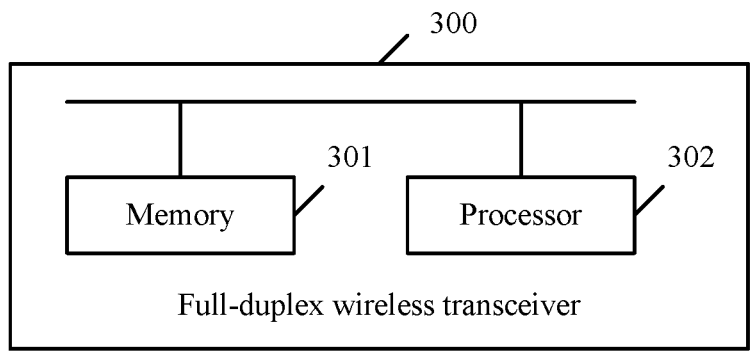
FIG. 3 is a schematic structural diagram of yet another full-duplex wireless transceiver according to an embodiment of the present invention.

Referring to FIG. 3, FIG. 3 is a schematic structural diagram of yet another full-duplex wireless transceiver according to an embodiment of the present invention. As shown in FIG. 3, the full-duplex wireless transceiver 300 may include a memory 301 and a processor 302, where the memory 301 stores a group of program code, and the processor 302 is configured to invoke the program code stored in the memory 301, and configured to perform the following operations:

modulating a transmit digital signal into a first radio frequency signal, and outputting the first radio frequency signal to a transmit antenna;

performing, under control of a pre-generated control signal, phase adjustment and amplitude adjustment on the first radio frequency signal, and obtaining a cancellation signal; and performing self-interference cancellation on a second radio frequency signal received from a radio air interface by using a receive antenna and the cancellation signal so as to generate a third radio frequency signal obtained after self-interference cancellation, and demodulating the third radio frequency signal into a receive digital signal.

In an embodiment, before the processor 302 performs, under control of a pre-generated control signal, phase adjustment and amplitude adjustment on the first radio frequency signal, the processor 302 is configured to invoke the program code stored in the memory 301, and further configured to perform the following operations:

computing a channel characteristic of a wireless self-interference channel between the transmit antenna and the receive antenna; and generating the control signal according to the channel characteristic.

In an embodiment, before the processor 302 obtains a cancellation signal, the processor 302 is configured to invoke the program code stored in the memory 301, and further configured to perform the following operation:

adjusting a delay of the first radio frequency signal according to the control signal.

According to this embodiment of the present invention, phase adjustment and amplitude adjustment, or phase adjustment, amplitude adjustment, and delay adjustment may be performed, according to a channel characteristic of a wireless self-interference channel, on a radio frequency signal that needs to be transmitted by a transmit antenna so as to generate a cancellation signal, and self-interference cancellation is performed on a radio frequency signal received by a receive antenna and the cancellation signal, which reduces interference of the sent radio frequency signal to the received radio frequency signal in a full-duplex communication mode, and improves reliability of mobile communications.

Figure 11:
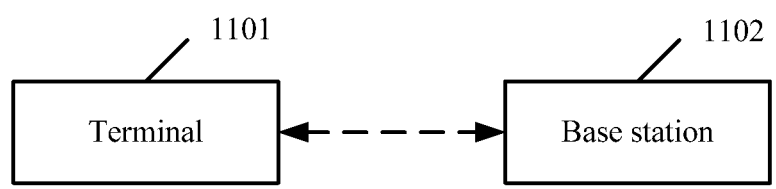
FIG. 11 is a schematic structural diagram of a wireless communications system according to an embodiment of the present invention.

Referring to FIG. 11, FIG. 11 is a schematic structural diagram of a wireless communications system according to an embodiment of the present invention. As shown in FIG. 11, the wireless communications system may include a terminal 1101 and a base station 1102.

The terminal 1101 supports a full-duplex communication mode, the base station 1102 supports a half-duplex communication mode, and the terminal 1101 includes a full-duplex wireless transceiver shown in FIG. 2; or the terminal 1101 supports a full-duplex communication mode, the base station 1102 supports a full-duplex communication mode, the terminal 1101 includes a full-duplex wireless transceiver shown in FIG. 2, and the base station 1102 includes the full-duplex wireless transceiver shown in FIG. 2; or the terminal 1101 supports a half-duplex communication mode, the base station 1102 supports a full-duplex communication mode, and the base station 1102 includes a full-duplex wireless transceiver shown in FIG. 2.

Figure 12:
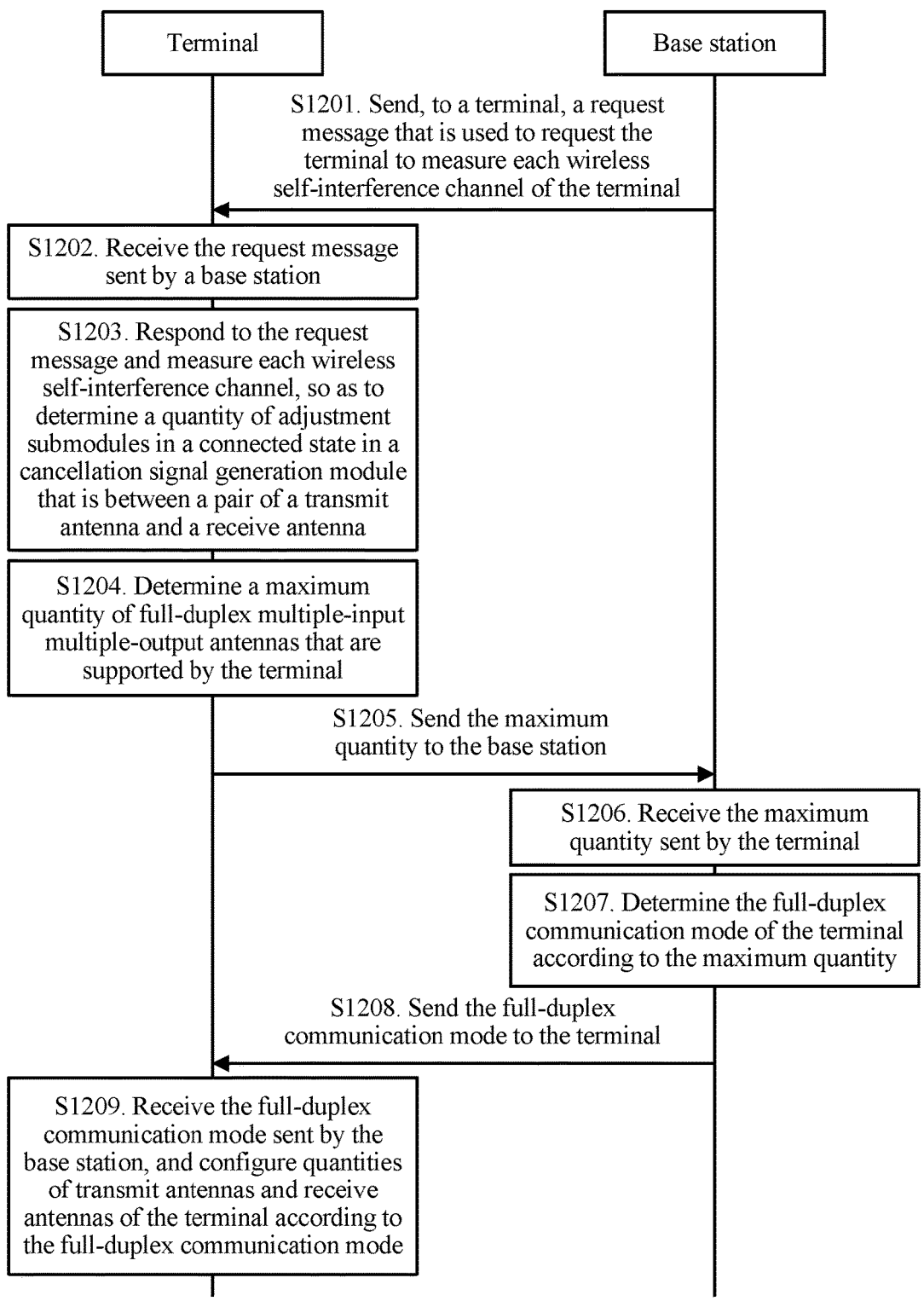
FIG. 12 is a schematic flowchart of signaling in a wireless communications system according to an embodiment of the present invention.

As an optional implementation manner, when the terminal 1101 supports the full-duplex communication mode, the terminal 1101 may include the full-duplex wireless transceiver shown in FIG. 2. In this case, an interaction process between the terminal 1101 and the base station 1102 may be shown in FIG. 12. FIG. 12 is a schematic flowchart of signaling in a wireless communications system according to an embodiment of the present invention. As shown in FIG. 12, the signaling process may include:

S1201. The base station sends, to the terminal, a request message that is used to request the terminal to measure each wireless self-interference channel of the terminal.

S1202. The terminal receives the request message sent by the base station.

S1203. The terminal responds to the request message and measures each wireless self-interference channel, so as to determine a quantity of adjustment submodules in a connected state in a cancellation signal generation module that is between a pair of a transmit antenna and a receive antenna.

In this embodiment of the present invention, the quantity of adjustment submodules in the connected state in the cancellation signal generation module that is between the pair of the transmit antenna and the receive antenna may be determined in manner 1 provided in Embodiment 2 of the present invention.

S1204. The terminal determines a maximum quantity of full-duplex multiple-input multiple-output antennas that are supported by the terminal.

In this embodiment of the present invention, it may be learned from an MIMO (Multiple Input Multiple Output, multiple-input multiple-output) channel capacity formula that, in a case in which a signal-to-noise ratio SNR is relatively high, the terminal may obtain a relatively high channel capacity by using multiple transmit antennas, and in a case in which a signal-to-noise ratio SNR is relatively low, the terminal may obtain the relatively high channel capacity by using multiple receive antennas. To implement a multiple-input multiple-output full-duplex communication mode of the terminal, the terminal may determine, in the following manners, the maximum quantity of full-duplex multiple-input multiple-output antennas that can be supported by the terminal.

In a case in which the signal-to-noise ratio SNR is relatively high, the terminal may first add a transmit antenna (transmit link), and in this case, the terminal needs to add at least $R_N$ ($R_N$ is a quantity of current receive antennas) adjustment submodules (that is, a cancellation signal generation module between the added transmit antenna and each receive antenna of the current receive antennas includes at least one adjustment submodule) for this transmit link; or in a case in which the signal-to-noise ratio SNR is relatively low, the terminal may first add a receive antenna (receive link), and in this case, the terminal needs to add at least $T_N$ ($T_N$ is a quantity of current transmit antennas) adjustment submodules for this receive link. Then, the terminal may determine the quantity of adjustment submodules in the connected state between the pair of the transmit antenna and the receive antenna in manner 1 in Embodiment 2 of the present invention, and after multiple iterations, finally obtains a quantity of adjustment submodules actually in the connected state between the pair of the transmit antenna and the receive antenna and the maximum quantity of full-duplex multiple-input multiple-output antennas that can be supported by the terminal.

S1205. The terminal sends the maximum quantity to the base station.

S1206. The base station receives the maximum quantity sent by the terminal.

S1207. The base station determines the full-duplex communication mode of the terminal according to the maximum quantity.

S1208. The base station sends the full-duplex communication mode to the terminal.

S1209. The terminal receives the full-duplex communication mode sent by the base station, and configures quantities of transmit antennas and receive antennas of the terminal according to the full-duplex communication mode.

Figure 13:
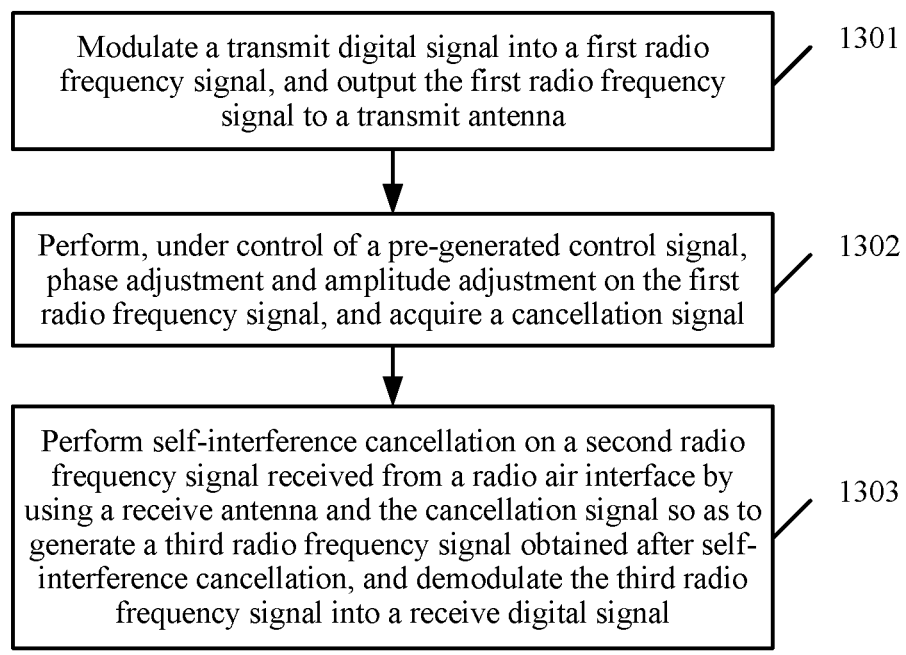
FIG. 13 is a schematic flowchart of a wireless communication method according to an embodiment of the present invention.

Referring to FIG. 13, FIG. 13 is a schematic flowchart of a wireless communication method according to an embodiment of the present invention. The method shown in FIG. 13 may be applied to a terminal and a base station, for example, a mobile phone (such as an Android mobile phone and an iOS mobile phone), a tablet computer, a palmtop computer, a mobile Internet device (Mobile Internet Devices, MID), and a PAD, which is not limited in this embodiment of the present invention. As shown in FIG. 13, the method may include the following steps:

S1301. Modulate a transmit digital signal into a first radio frequency signal, and output the first radio frequency signal to a transmit antenna.

S1302. Perform, under control of a pre-generated control signal, phase adjustment and amplitude adjustment on the first radio frequency signal, and obtain a cancellation signal.

In this embodiment of the present invention, the control signal may include a first control signal for phase adjustment and a second control signal for amplitude adjustment.

S1303. Perform self-interference cancellation on a second radio frequency signal received from a radio air interface by using a receive antenna and the cancellation signal so as to generate a third radio frequency signal obtained after self-interference cancellation, and demodulate the third radio frequency signal into a receive digital signal.

In this embodiment of the present invention, after modulating a transmit digital signal into a first radio frequency signal, a full-duplex wireless transceiver outputs the first radio frequency signal to a transmit antenna, then performs, under control of a pre-generated control signal, phase adjustment and amplitude adjustment on the first radio frequency signal and obtains a cancellation signal, performs self-interference cancellation on a second radio frequency signal received from a radio air interface by using a receive antenna and the cancellation signal so as to generate a third radio frequency signal obtained after self-interference cancellation, and finally demodulates the third radio frequency signal into a receive digital signal. According to this embodiment of the present invention, phase adjustment and amplitude adjustment may be performed, according to a channel characteristic of a wireless self-interference channel, on a radio frequency signal transmitted by a transmit antenna so as to generate a cancellation signal, and self-interference cancellation is performed on a radio frequency signal received by a receive antenna and the cancellation signal, which reduces interference of the sent radio frequency signal to the received radio frequency signal in a full-duplex communication mode, and improves reliability of mobile communications.

Figure 14:
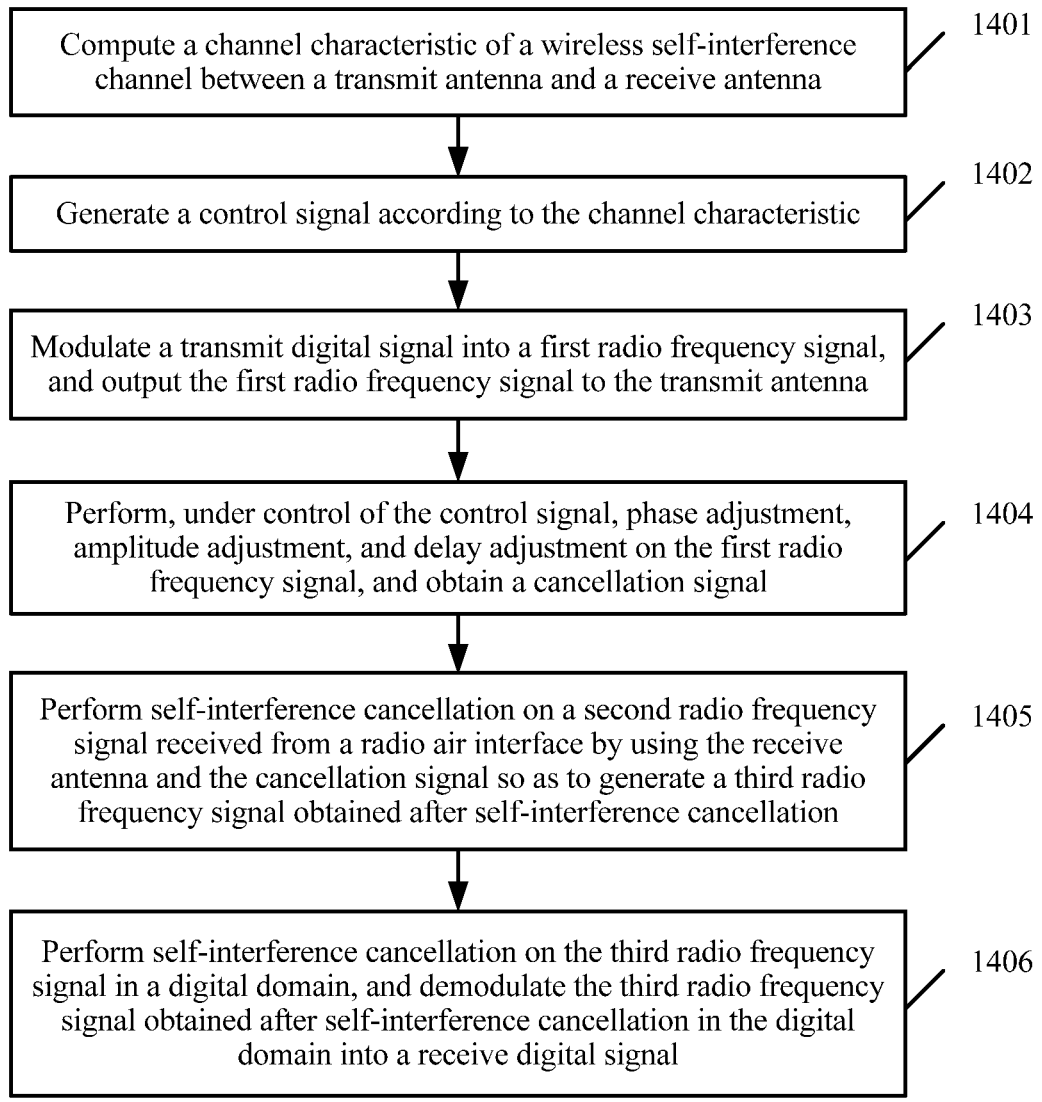
FIG. 14 is a schematic flowchart of another wireless communication method according to an embodiment of the present invention.

Referring to FIG. 14, FIG. 14 is a schematic flowchart of another wireless communication method according to an embodiment of the present invention. The method shown in FIG. 14 may be applied to a terminal and a base station, for example, a mobile phone (such as an Android mobile phone and an iOS mobile phone), a tablet computer, a palmtop computer, a mobile Internet device (Mobile Internet Devices, MID), and a PAD, which is not limited in this embodiment of the present invention. As shown in FIG. 14, the method may include the following steps:

S1401. Compute a channel characteristic of a wireless self-interference channel between a transmit antenna and a receive antenna.

S1402. Generate a control signal according to the channel characteristic.

In this embodiment of the present invention, the control signal may include a first control signal for phase adjustment, a second control signal for amplitude adjustment, and a third control signal for delay adjustment.

S1403. Modulate a transmit digital signal into a first radio frequency signal, and output the first radio frequency signal to the transmit antenna.

S1404. Perform, under control of the control signal, phase adjustment, amplitude adjustment, and delay adjustment on the first radio frequency signal, and obtain a cancellation signal.

S1405. Perform self-interference cancellation on a second radio frequency signal received from a radio air interface by using the receive antenna and the cancellation signal so as to generate a third radio frequency signal obtained after self-interference cancellation.

S1406. Perform self-interference cancellation on the third radio frequency signal in a digital domain, and demodulate the third radio frequency signal obtained after self-interference cancellation in the digital domain into a receive digital signal.

According to this embodiment of the present invention, phase adjustment, amplitude adjustment, and delay adjustment may be performed, according to a channel characteristic of a wireless self-interference channel, on a radio frequency signal transmitted by a transmit antenna so as to generate a cancellation signal, and self-interference cancellation is performed on a radio frequency signal received by a receive antenna and the cancellation signal, which reduces interference of the sent radio frequency signal to the received radio frequency signal in a full-duplex communication mode, and improves reliability of mobile communications.

It should be noted that, in the foregoing embodiments, the descriptions of the embodiments have their respective focuses. For a part that is not described in detail in an embodiment, reference may be made to related descriptions in other embodiments. In addition, a person skilled in the art should also understand that all the embodiments described in this specification belong to embodiments, and the involved actions and modules are not necessarily mandatory to the present invention.

Steps in the methods in the embodiments of the present invention may be adjusted in sequence, combined, or removed according to an actual requirement.

Modules and submodules in the full-duplex wireless transceiver in the embodiments of the present invention may be combined, divided, or removed according to an actual requirement.

The modules or submodules in the embodiments of the present invention may be implemented by using a universal integrated circuit, for example, a central processing unit (CPU) or by using an application-specific integrated circuit (ASIC).

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (Read-Only Memory, ROM), a random access memory (Random Access Memory, RAM), or the like.

The foregoing describes in detail a wireless communications method and system, and a full-duplex wireless transceiver provided in the embodiments of the present invention. In this specification, specific examples are used to describe the principle and implementation manners of the present invention, and the description of the embodiments is intended only to help understand the method and core idea of the present invention. Meanwhile, a person of ordinary skill in the art may, based on the idea of the present invention, make modifications with respect to the specific implementation manners and the application scope. Therefore, the content of this specification shall not be construed as a limitation on the present invention.

What is claimed is:

1. A full-duplex wireless transceiver, comprising:
a memory to store instructions; and
a processor to execute the instructions to configure the full-duplex wireless transceiver to implement:
a sending module, a receiving module, a cancellation signal generation module, and a channel estimation module, wherein the cancellation signal generation module comprises several adjustment submodules, an output end of the sending module is connected to an input end of the cancellation signal generation module and a transmit antenna, an output end of the cancellation signal generation module is connected to a first input end of the receiving module, a second input end of the receiving module is connected to a receive antenna, a control end of the cancellation signal generation module is connected to an output end of the channel estimation module, a first input end of the channel estimation module is connected to an output end of the receiving module, and a second input end of the channel estimation module is connected to an input end of the sending module, wherein:
the channel estimation module is configured to compute a channel characteristic of a wireless self-interference channel between the transmit antenna and the receive antenna, generate a control signal according to the channel characteristic, and output the control signal to the adjustment submodule;
the sending module is configured to modulate an input transmit digital signal into a first radio frequency signal, and output the first radio frequency signal to the adjustment submodule and the transmit antenna;
the adjustment submodule is configured to receive the first radio frequency signal and the control signal and perform, under control of the control signal, phase adjustment and amplitude adjustment on the first radio frequency signal, and obtain a cancellation signal;
the adjustment submodule is further configured to output the cancellation signal to the receiving module;
the receiving module is configured to receive the cancellation signal and receive a second radio frequency signal from a radio air interface, and perform self-interference cancellation on the second radio frequency signal and the cancellation signal so as to generate a third radio frequency signal obtained after self-interference cancellation; and
the receiving module is further configured to demodulate the third radio frequency signal into a receive digital signal, wherein
the adjustment submodule that is configured to perform phase adjustment and amplitude adjustment on the first radio frequency signal comprises:
a first vector modulator,
a first numerical control delay line and a first numerical control attenuator, or
the first vector modulator, the first numerical control delay line, and the first numerical control attenuator.

2. The full-duplex wireless transceiver according to claim 1, wherein an input end of the first vector modulator is connected to an output end of the sending module, an output end of the first vector modulator is connected to a first input end of the receiving module, and a control end of the first vector modulator is connected to an output end of the channel estimation module, wherein:
the first vector modulator is configured to adjust a phase and an amplitude of the first radio frequency signal according to the control signal so as to obtain the cancellation signal, and output the cancellation signal to the first input end of the receiving module.

3. The full-duplex wireless transceiver according to claim 1, wherein an input end of the first numerical control delay line is connected to the output end of the sending module, an output end of the first numerical control delay line is connected to an input end of the first numerical control attenuator, a control end of the first numerical control delay line and a control end of the first numerical control attenuator are separately connected to the output end of the channel estimation module, and an output end of the first numerical control attenuator is connected to the first input end of the receiving module, wherein:
the first numerical control delay line is configured to adjust a phase of the first radio frequency signal according to the control signal so as to obtain the phase-adjusted first radio frequency signal, and output the first radio frequency signal to the first numerical control attenuator; and
the first numerical control attenuator is configured to adjust an amplitude of the first radio frequency signal according to the control signal so as to generate the cancellation signal, and output the cancellation signal to the first input end of the receiving module.

4. A full-duplex wireless transceiver, comprising:
a memory to store instructions; and
a processor to execute the instructions to configure the full-duplex wireless transceiver to implement:
a sending module, a receiving module, a cancellation signal generation module, and a channel estimation module, wherein the cancellation signal generation module comprises several adjustment submodules, an output end of the sending module is connected to an input end of the cancellation signal generation module and a transmit antenna, an output end of the cancellation signal generation module is connected to a first input end of the receiving module, a second input end of the receiving module is connected to a receive antenna, a control end of the cancellation signal generation module is connected to an output end of the channel estimation module, a first input end of the channel estimation module is connected to an output end of the receiving module, and a second input end of the channel estimation module is connected to an input end of the sending module, wherein:

the channel estimation module is configured to compute a channel characteristic of a wireless self-interference channel between the transmit antenna and the receive antenna, generate a control signal according to the channel characteristic, and output the control signal to the adjustment submodule;

the sending module is configured to modulate an input transmit digital signal into a first radio frequency signal, and output the first radio frequency signal to the adjustment submodule and the transmit antenna;

the adjustment submodule is configured to receive the first radio frequency signal and the control signal and perform, under control of the control signal, phase adjustment and amplitude adjustment on the first radio frequency signal, and obtain a cancellation signal;

the adjustment submodule is further configured to output the cancellation signal to the receiving module;

the receiving module is configured to receive the cancellation signal and receive a second radio frequency signal from a radio air interface, and perform self-interference cancellation on the second radio frequency signal and the cancellation signal so as to generate a third radio frequency signal obtained after self-interference cancellation; and the receiving module is further configured to demodulate the third radio frequency signal into a receive digital signal, wherein at least one of the adjustment submodules in the several adjustment submodules is further configured to perform delay adjustment on the first radio frequency signal, wherein the adjustment submodule that is configured to perform phase adjustment, amplitude adjustment, and delay adjustment on the first radio frequency signal comprises:

a second vector modulator and a second numerical control delay line, a third numerical control delay line, a second numerical control attenuator, and a fourth numerical control delay line, or the second vector modulator, the second numerical control delay line, the third numerical control delay line, the second numerical control attenuator, and the fourth numerical control delay line.

5. The full-duplex wireless transceiver according to claim 4, wherein the cancellation signal generation modules between one transmit antenna and multiple receive antennas share the second numerical control delay line.

6. The full-duplex wireless transceiver according to claim 4, wherein the cancellation signal generation modules between one transmit antenna and multiple receive antennas share the fourth numerical control delay line.

7. The full-duplex wireless transceiver according to claim 4, wherein an input end of the second numerical control delay line is connected to the output end of the sending module, an output end of the second numerical control delay line is connected to an input end of the second vector modulator, a control end of the second numerical control delay line and a control end of the second vector modulator are separately connected to the output end of the channel estimation module, and an output end of the second vector modulator is connected to the first input end of the receiving module, wherein:

the second numerical control delay line is configured to adjust a delay of the first radio frequency signal according to the control signal so as to obtain the delay-adjusted first radio frequency signal, and output the first radio frequency signal to the second vector modulator; and the second vector modulator is configured to adjust a phase and an amplitude of the first radio frequency signal according to the control signal so as to obtain the cancellation signal, and output the cancellation signal to the first input end of the receiving module.

8. The full-duplex wireless transceiver according to claim 4, wherein an input end of the third numerical control delay line is connected to the output end of the sending module, an output end of the third numerical control delay line is connected to an input end of the second numerical control attenuator, a control end of the third numerical control delay line, a control end of the second numerical control attenuator, and a control end of the fourth numerical control delay line are separately connected to the output end of the channel estimation module, an output end of the second numerical control attenuator is connected to an input end of the fourth numerical control delay line, and an output end of the fourth numerical control delay line is connected to the first input end of the receiving module, wherein:

the third numerical control delay line is configured to adjust a phase of the first radio frequency signal according to the control signal so as to obtain the phase-adjusted first radio frequency signal, and output the first radio frequency signal to the second numerical control attenuator;

the second numerical control attenuator is configured to adjust an amplitude of the first radio frequency signal according to the control signal so as to obtain the amplitude-adjusted first radio frequency signal, and output the first radio frequency signal to the fourth numerical control delay line; and the fourth numerical control delay line is configured to adjust a delay of the first radio frequency signal according to the control signal so as to generate the cancellation signal, and output the cancellation signal to the first input end of the receiving module.

9. A full-duplex wireless transceiver, comprising:

a memory to store instructions; and a processor to execute the instructions to configure the full-duplex wireless transceiver to implement:

a sending module, a receiving module, a cancellation signal generation module, and a channel estimation module, wherein the cancellation signal generation module comprises several adjustment submodules, an output end of the sending module is connected to an input end of the cancellation signal generation module and a transmit antenna, an output end of the cancellation signal generation module is connected to a first input end of the receiving module, a second input end of the receiving module is connected to a receive antenna, a control end of the cancellation signal generation module is connected to an output end of the channel estimation module, a first input end of the channel estimation module is connected to an output end of the receiving module, and a second input end of the channel estimation module is connected to an input end of the sending module, wherein:

the channel estimation module is configured to compute a channel characteristic of a wireless self-interference channel between the transmit antenna and the receive antenna, generate a control signal according to the channel characteristic, and output the control signal to the adjustment submodule;

the sending module is configured to modulate an input transmit digital signal into a first radio frequency signal, and output the first radio frequency signal to the adjustment submodule and the transmit antenna;

the adjustment submodule is configured to receive the first radio frequency signal and the control signal and perform, under control of the control signal, phase adjustment and amplitude adjustment on the first radio frequency signal, and obtain a cancellation signal;

the adjustment submodule is further configured to output the cancellation signal to the receiving module;

the receiving module is configured to receive the cancellation signal and receive a second radio frequency signal from a radio air interface, and perform self-interference cancellation on the second radio frequency signal and the cancellation signal so as to generate a third radio frequency signal obtained after self-interference cancellation; and the receiving module is further configured to demodulate the third radio frequency signal into a receive digital signal, wherein the cancellation signal generation module further comprises a switch control submodule and switch submodules that are in a one-to-one correspondence with the several adjustment submodules, wherein:

the switch submodule is configured to control a work status of the adjustment submodule between a pair of the first radio frequency signal and the second radio frequency signal, wherein the adjustment submodule is corresponding to the switch submodule, and the work status comprises a connected state or a non-connected state; and the switch control submodule is configured to determine a quantity of adjustment submodules in the connected state in the several adjustment submodules by using a predefined criterion.

10. The full-duplex wireless transceiver according to claim 9, wherein a manner in which the switch control submodule determines a quantity of adjustment submodules in the connected state in the several adjustment submodules by using a predefined criterion comprises:

at least one of:
obtaining energy corresponding to each path in N paths of the wireless self-interference channel from the channel estimation module; and
determining M paths from the N paths, so that a ratio of a first sum of energy corresponding to each path in the M paths to a second sum of energy corresponding to each path in remaining (N-M) paths of the N paths apart from the M paths is greater than a preset first threshold, wherein the energy corresponding to any path in the M paths is greater than the energy corresponding to any path in the (N-M) paths, and M is a positive integer and M is the quantity of adjustment submodules in the connected state in the several adjustment submodules determined by the switch control submodule, and N is greater than M;

or obtaining a first received signal strength indicator of the second radio frequency signal and a second received signal strength indicator of the third radio frequency signal;
when the second received signal strength indicator of the third radio frequency signal is greater than a preset second threshold, or when a difference between the first received signal strength indicator of the second radio frequency signal and the second received signal strength indicator of the third radio frequency signal is less than a preset third threshold, increasing the quantity of adjustment submodules in the connected state; or
when a difference between the first received signal strength indicator of the second radio frequency signal and the second received signal strength indicator of the third radio frequency signal is greater than a preset fourth threshold, decreasing the quantity of adjustment submodules in the connected state.

11. A full-duplex wireless transceiver, comprising:
a memory to store a group of program code: and
a processor configured to invoke the program code stored in the memory to configure the full-duplex wireless transceiver to perform the following operations:
modulating a transmit digital signal into a first radio frequency signal, and outputting the first radio frequency signal to a transmit antenna;
performing, under control of a pre-generated control signal, phase adjustment and amplitude adjustment on the first radio frequency signal, and obtaining a cancellation signal; and
performing self-interference cancellation on a second radio frequency signal received from a radio air interface by using a receive antenna and the cancellation signal so as to generate a third radio frequency signal obtained after self-interference cancellation,
performing self-interference cancellation on the third radio frequency signal in a digital domain, and
demodulating the third radio frequency signal obtained after self-interference cancellation in the digital domain into a receive digital signal.

12. The full-duplex wireless transceiver according to claim 11, wherein before the processor performs, under control of a pre-generated control signal, phase adjustment and amplitude adjustment on the first radio frequency signal, the processor is configured to invoke the program code stored in the memory, and further configured to perform the following operations:
computing a channel characteristic of a wireless self-interference channel between the transmit antenna and the receive antenna; and
generating the control signal according to the channel characteristic.

13. The full-duplex wireless transceiver according to claim 11, wherein before the processor obtains a cancellation signal, the processor is configured to invoke the program code stored in the memory, and further configured to perform the following operation:

adjusting a delay of the first radio frequency signal according to the control signal.

14. A wireless communications system, comprising:
a terminal;
a base station; and
a full-duplex wireless transceiver, comprising:
   a memory to store instructions; and
   a processor to execute the instructions to configure the full-duplex wireless transceiver to implement:
      a sending module, a receiving module, a cancellation signal generation module, and a channel estimation module, wherein the cancellation signal generation module comprises several adjustment submodules, an output end of the sending module is connected to an input end of the cancellation signal generation module and a transmit antenna, an output end of the cancellation signal generation module is connected to a first input end of the receiving module, a second input end of the receiving module is connected to a receive antenna, a control end of the cancellation signal generation module is connected to an output end of the channel estimation module, a first input end of the channel estimation module is connected to an output end of the receiving module, and a second input end of the channel estimation module is connected to an input end of the sending module, wherein:
      the channel estimation module is configured to compute a channel characteristic of a wireless self-interference channel between the transmit antenna and the receive antenna, generate a control signal according to the channel characteristic, and output the control signal to the adjustment submodule;
      the sending module is configured to modulate an input transmit digital signal into a first radio frequency signal, and output the first radio frequency signal to the adjustment submodule and the transmit antenna;
      the adjustment submodule is configured to receive the first radio frequency signal and the control signal and perform, under control of the control signal, phase adjustment and amplitude adjustment on the first radio frequency signal, and obtain a cancellation signal;
      the adjustment submodule is further configured to output the cancellation signal to the receiving module;
      the receiving module is configured to receive the cancellation signal and receive a second radio frequency signal from a radio air interface, and perform self-interference cancellation on the second radio frequency signal and the cancellation signal so as to generate a third radio frequency signal obtained after self-interference cancellation; and
      the receiving module is further configured to demodulate the third radio frequency signal into a receive digital signal, wherein the cancellation signal generation module further comprises a switch control submodule and switch submodules that are in a one-to-one correspondence with the several adjustment submodules, wherein:
      the switch submodule is configured to control a work status of the adjustment submodule between a pair of the first radio frequency signal and the second radio frequency signal, wherein the adjustment submodule is corresponding to the switch submodule, and the work status comprises a connected state or a non-connected state; and
      the switch control submodule is configured to determine a quantity of adjustment submodules in the connected state in the several adjustment submodules by using a predefined criterion,
      wherein:
      the terminal supports a full-duplex communication mode, the base station supports a half-duplex communication mode, and the terminal comprises the full-duplex wireless transceiver; or
      the terminal supports a full-duplex communication mode, the base station supports a full-duplex communication mode, the terminal comprises the full-duplex wireless transceiver, and the base station comprises the full-duplex wireless transceiver; or
      the terminal supports a half-duplex communication mode, the base station supports a full-duplex communication mode, and the base station comprises the full-duplex wireless transceiver.

15. A wireless communication method, comprising:
modulating a transmit digital signal into a first radio frequency signal, and outputting the first radio frequency signal to a transmit antenna;
performing, under control of a pre-generated control signal, phase adjustment and amplitude adjustment on the first radio frequency signal, and obtaining a cancellation signal; and
performing self-interference cancellation on a second radio frequency signal received from a radio air interface by using a receive antenna and the cancellation signal so as to generate a third radio frequency signal obtained after self-interference cancellation,
performing self-interference cancellation on the third radio frequency signal in a digital domain, and
demodulating the third radio frequency signal obtained after self-interference cancellation in the digital domain into a receive digital signal.

16. The method according to claim 15, wherein before the performing, under control of a pre-generated control signal, phase adjustment and amplitude adjustment on the first radio frequency signal, the method further comprises:
computing a channel characteristic of a wireless self-interference channel between the transmit antenna and the receive antenna; and
generating the control signal according to the channel characteristic.

17. The method according to claim 15, wherein before the obtaining a cancellation signal, the method further comprises:
adjusting a delay of the first radio frequency signal according to the control signal.

* * * * *